United States Patent
Wu et al.

(10) Patent No.: US 12,066,993 B2
(45) Date of Patent: Aug. 20, 2024

(54) CONSTRAINT-BASED INDEX TUNING IN DATABASE MANAGEMENT SYSTEMS UTILIZING REINFORCEMENT LEARNING

(71) Applicant: Microsoft Technology Licensing, LLC, Redmond, WA (US)

(72) Inventors: Wentao Wu, Bellevue, WA (US); Chi Wang, Redmond, WA (US); Tarique Ashraf Siddiqui, Redmond, WA (US); Vivek Ravindranath Narasayya, Redmond, WA (US); Surajit Chaudhuri, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 97 days.

(21) Appl. No.: 17/832,274

(22) Filed: Jun. 3, 2022

(65) Prior Publication Data
US 2023/0315702 A1    Oct. 5, 2023

Related U.S. Application Data

(60) Provisional application No. 63/325,538, filed on Mar. 30, 2022.

(51) Int. Cl.
*G06F 16/21* (2019.01)
*G06F 16/22* (2019.01)
*G06F 16/2453* (2019.01)

(52) U.S. Cl.
CPC ........ *G06F 16/217* (2019.01); *G06F 16/2246* (2019.01); *G06F 16/2453* (2019.01)

(58) Field of Classification Search
CPC . G06F 16/217; G06F 16/2246; G06F 16/2453
See application file for complete search history.

(56) References Cited

U.S. PATENT DOCUMENTS

| | | | |
|---|---|---|---|
| 2015/0081667 A1* | 3/2015 | Hagenbuch | G06F 11/0778 707/718 |
| 2019/0034463 A1* | 1/2019 | Jeong | G06F 16/23 |
| 2020/0073986 A1* | 3/2020 | Purcell | G06F 16/21 |

FOREIGN PATENT DOCUMENTS

| CN | 114637775 A * | 6/2022 | G06F 16/2453 |
|---|---|---|---|
| EP | 4227821 A1 * | 8/2023 | G06F 16/2272 |

OTHER PUBLICATIONS

"Amazon RDS", Retrieved from: https://web.archive.org/web/20220412005250/https://aws.amazon.com/rds/, Apr. 12, 2022, 5 Pages.

(Continued)

*Primary Examiner* — Huawen A Peng
(74) *Attorney, Agent, or Firm* — Ray, Quinney & Nebeker; Christopher K. Hallstrom

(57) ABSTRACT

The present disclosure relates to systems, methods, and computer-readable media for determining optimal index configurations for processing workloads in a database management system. For instance, an index configuration system can efficiently determine a subset of indexes for processing a workload utilizing one or more reinforcement learning models. For example, in various implementations, the index configuration system utilizes a Markov decision process and/or a Monte Carlo tree search model to determine an optimal subset of indexes for processing a workload in a manner that effectively utilizes computing device resources while also avoiding significant interference with customer workloads.

20 Claims, 9 Drawing Sheets

(56) References Cited

OTHER PUBLICATIONS

"Azure SQL Database", Retrieved from: https://web.archive.org/web/20220408100825/https://azure.microsoft.com/en- us/products/azure-sql/database/, Apr. 8, 2022, 14 Pages.

"Cloud SQL", Retrieved from: https://web.archive.org/web/20220406024038/https://cloud.google.com/sql/, Apr. 6, 2022, 10 Pages.

"Dynamic Programming", In Journal of Science, vol. 153, Jul. 1966, 14 Pages.

"Oracle Database", Retrieved from: https://www.oracle.com/database/, Retrieved Date: Mar. 5, 2022, 6 pages.

"Shankur / autoindex", Retrieved from: https://github.com/shankur/autoindex, May 13, 2020, 2 Pages.

Audibert, et al., "Use of variance estimation in the multi-armed bandit problem.", Retrieved from: https://hal.inria.fr/inria-00203496/file/ucbtuned.pdf, Jan. 2006, 8 Pages.

Agarwal, et al., "Automated selection of materialized views and indexes in SQL databases", In Proceedings of the 6th International Conference on Very Large Data Bases, Sep. 10, 2000, pp. 496-505.

Auer, et al., "Finite-Time Analysis of the Multiarmed Bandit Problem", In Journal of Machine Learning, vol. 47, Issue 2-3, May 2002, pp. 235-256.

Auer, Peter, "Using Confidence Bounds for Exploitation-Exploration Tradeoffs", In Journal of Journal of Machine Learning Research 3, Nov. 2002, pp. 397-422.

Basu, et al., "Cost-Model Oblivious Database Tuning with Reinforcement Learning", In Proceedings of International Conference on Database and Expert Systems Applications, Sep. 4, 2015, pp. 253-268.

Wu, et al., "Budget-aware Index Tuning with Reinforcement Learning", In Proceedings of the International Conference on Management of Data, Jun. 12, 2022, pp. 1528-1541.

Browne, et al., "A Survey of Monte Carlo Tree Search Methods", In IEEE Transactions on Computational Intelligence and AI in game, vol. 4, No. 1, Mar. 2012, 49 Pages.

Bruno, et al., "An Online Approach to Physical Design Tuning", In Proceedings of IEEE 23rd International Conference on Data Engineering, Apr. 15, 2007, pp. 826-835.

Bruno, et al., "Automatic physical database tuning: a relaxation-based approach", In Proceedings of the ACM SIGMOD international conference on Management of data, Jun. 14, 2005, pp. 227-238.

Bruno, et al., "Constrained physical design tuning", In Proceedings of the VLDB Endowment, vol. 1 , Issue 1, Aug. 23, 2008, pp. 4-15.

Bruno, et al., "Physical design refinement: The 'merge-reduce' approach", In Journal of ACM Transactions on Database Systems, vol. 32, Issue 4, Nov. 1, 2007, 43 Pages.

Chaudhuri, et al., "An Efficient Cost-Driven Index Selection Tool for Microsoft SQL Server", In Proceedings of the 23rd International Conference on Very Large Data Bases, Aug. 25, 1997, pp. 146-155.

Chaudhuri, et al., "Anytime Algorithm of Database Tuning Advisor for Microsoft SQL Server", Retrieved from: https://www.microsoft.com/en-us/research/uploads/prod/2020/06/Anytime-Algorithm-of-Database-Tuning-Advisor-for-Microsoft-SQL-Server.pdf, Jun. 2020, 10 Pages.

Chaudhuri, et al., "AutoAdmin 'What-if' Index Analysis Utility", In ACM SIGMOD Record, Jun. 1, 1998, pp. 367-378.

Chaudhuri, et al., "Compressing SQL workloads", In Proceedings of the ACM SIGMOD international conference on Management of data, Jun. 4, 2002, pp. 488-499.

Chaudhuri, et al., "Index merging", In Proceedings of 15th International Conference on Data Engineering, Mar. 23, 1999, 8 Pages.

Chauhdhri, et al., "Index Selection for Databases: A Hardness Study and a Principled Heuristic Solution", In journal of IEEE Transactions on Knowledge and Data Engineering, vol. 16, Issue 11, Nov. 2004, pp. 1313-1323.

Choenni, et al., "On the Selection of Secondary Indices in Relational Databases", In Journal of Data & knowledge Engineering, vol. 11, Issue 3, Dec. 1, 1993, pp. 207-233.

Comer, Douglas, "The Difficulty of Optimum Index Selection", In Journal of ACM Transactions on Database Systems, vol. 3, No. 4, Dec. 1978, pp. 440-445.

Das, et al., "Automatically Indexing Millions of Databases in Microsoft Azure SQL Database", In Proceedings of the International Conference on Management of Data, Jun. 30, 2019, pp. 666-679.

Dash, et al., "CoPhy: A Scalable, Portable, and Interactive Index Advisor for Large Workloads", In Proceedings of VLDB Endowment, vol. 4, Issue 6, Aug. 29, 2011, pp. 362-372.

Dash, et al., "Efficient use of the query optimizer for automated database design", In Proceedings of the 33rd international conference on Very large data bases, Sep. 23, 2007, pp. 1093-1104.

Deep, et al., "Comprehensive and Efficient Workload Compression", In Proceedings of the VLDB Endowment, vol. 14, Nov. 11, 2020, pp. 418-430.

Ding, et al., "AI Meets AI: Leveraging Query Executions to Improve Index Recommendations", In Proceedings of the International Conference on Management of Data, Jun. 30, 2019, pp. 1241-1258.

Finkelstein, et al., "Physical Database Design for Relational Databases", In Journal of ACM Transactions on Database Systems, vol. 13, Issue 1, Mar. 1, 1988, pp. 91-128.

François-Lavet, et al., "An Introduction to Deep Reinforcement Learning", In Publication of Now Foundations and Trends, vol. 11, Issue 3-4, Dec. 20, 2018, pp. 219-354.

Gelly, et al., "Monte-Carlo tree search and rapid action value estimation in computer Go", In Journal of Artificial Intelligence, vol. 175, Issue 11, Apr. 6, 2011, pp. 1856-1875.

Ghanayem, et al., "dta utility", Retrieved from: https://docs.microsoft.com/en-us/sql/tools/dta/dta-utility?view=sql-server-ver15, May 12, 2021, 14 Pages.

Gupta, et al., "Index Selection for Olap", In Proceedings 13th International Conference on Data Engineering, Apr. 7, 1997, 12 Pages.

Hester, et al., "Deep Q-Learning from Demonstrations", In Proceedings of the Thirty-Second AAAI Conference on Artificial Intelligence, Apr. 29, 2018, pp. 3223-3230.

Kaelbling, et al., "Reinforcement learning: A survey", In Journal of Artificial Intelligence Research, vol. 4, May 1996, pp. 237-285.

Kane, Andrew, "Introducing Dexter, the Automatic Indexer for Postgres", Retrieved from: https://medium.com/@ankane/introducing-dexter-the-automatic-indexer-for-postgres-5f8fa8b28f27, Jun. 27, 2017, 3 Pages.

Kocsis, et al., "Bandit based Monte-Carlo Planning", In Proceedings of the 17th European Conference on Machine Learning, Sep. 18, 2006, pp. 282-293.

Kossmann, et al., "Magic mirror in my hand, which is the best in the land? An Experimental Evaluation of Index Selection Algorithms", In Proceedings of the VLDB Endowment, vol. 13, Issue 12, Jul. 1, 2020, pp. 2382-2395.

Krause, et al., "Submodular Function Maximization", In Journal of Tractability, Feb. 2014, pp. 1-28.

Lan, et al., "An Index Advisor Using Deep Reinforcement Learning", In Proceedings of the 29th ACM International Conference on Information & Knowledge Management, Oct. 19, 2020, pp. 2105-2108.

Leis, et al., "How Good Are Query Optimizers, Really?", In Proceedings of the VLDB Endowment, vol. 9, Issue 3, Nov. 1, 2015, pp. 204-215.

Lillicrap, et al., "Continuous control with deep reinforcement learning", In Proceedings of 4th International Conference on Learning Representations, May 2, 2016, pp. 1-14.

Nemhauser, et al., "An analysis of approximations for maximizing submodular set functions—I", In Journal of Mathematical programming, vol. 14, Issue 1, Dec. 1978, pp. 265-294.

Perera, et al., "DBA bandits: Self-driving index tuning under ad-hoc, analytical workloads with safety guarantees", In Repository of arXiv:2010.09208v2, Oct. 20, 2020, 12 pages.

Peret, et al., "On-line search for solving Markov Decision Processes via heuristic sampling", In Proceedings of the 16th European Conference on Artificial Intelligence, Aug. 22, 2004, 5 Pages.

(56) References Cited

OTHER PUBLICATIONS

Puterman, et al., "Modified policy iteration algorithms for discounted Markov decision problems", In Journal of Management Science, vol. 24, Issue 11, Jul. 1978, pp. 1127-1137.

Qin, et al., "Contextual Combinatorial Bandit and its Application on Diversified Online Recommendation", In Proceedings of SIAM International Conference on Data Mining, Apr. 24, 2014, pp. 461-469.

Rahn, et al., "join-order-benchmark", Retrieved from: https://github.com/gregrahn/join-order-benchmark, Apr. 9, 2019, 5 Pages.

Arulraj, et al., "Predictive Indexing", In Repository of arXiv:1901.07064v1, Jan. 21, 2019, 12 Pages.

Basu, et al., "Regularized Cost-Model Oblivious Database Tuning with Reinforcement Learning", In Transactions on Large-Scale Data-and Knowledge-Centered Systems XXVIII: Special Issue on Database-and Expert-Systems Applications, Sep. 10, 2016, pp. 96-132.

Valavala, et al., "Methodology: Automatic Database Index Tuning Using Machine Learning", In Proceedings of IEEE International Conference on Intelligent Systems, Smart and Green Technologies, Nov. 13, 2021, pp. 109-113.

"International Search Report and Written Opinion Issued in PCT Application No. PCT/US2023/012962", Mailed Date: May 8, 2023, 11 Pages.

Pedrozo, et al., "An Adaptive Approach for Index Tuning with Learning Classifier Systems on Hybrid Storage Environments", In Proceedings of the 13th International Conference on Hybrid Artificial Intelligent Systems, Jun. 20, 2018, pp. 716-729.

Wu, et al., "Predicting query execution time: Are optimizer cost models really unusable?", In Proceedings of IEEE 29th International Conference on Data Engineering, Apr. 8, 2013, pp. 1081-1092.

Ross, Sheldon, "Introduction to stochastic dynamic programming", In Publication of Academic press, Jul. 10, 2014, 166 Pages.

Rubinstein, Reuven, "The Cross-Entropy Method for Combinatorial and Continuous Optimization", In Journal of Methodology and computing in applied probability vol. 1, Issue 2, Sep. 1999, pp. 127-190.

Rummery, et al., "On-line Q-learning using connectionist systems", In Technical Report of University of Cambridge, Sep. 1994, 21 Pages.

Sadri, et al., "Online Index Selection Using Deep Reinforcement Learning for a Cluster Database", In Proceedings of IEEE 36th International Conference on Data Engineering Workshops (ICDEW), Apr. 20, 2020, pp. 158-161.

Schlosser, et al., "Efficient Scalable Multi-attribute Index Selection Using Recursive Strategies", In Proceedings of IEEE 35th International Conference on Data Engineering, Apr. 8, 2019, 12 pages.

Schnaitter, et al., "Index Interactions in Physical Design Tuning: Modeling, Analysis, and Applications", In Proceedings of the VLDB Endowment, vol. 2, Issue 1, Aug. 24, 2009, pp. 1234-1245.

Sharma, et al., "The Case for Automatic Database Administration using Deep Reinforcement Learning", In Journal of Computing Research Repository, Jan. 2018, 9 Pages.

Sutton, et al., "Reinforcement Learning: An Introduction", In Publication of MIT Press, Nov. 13, 2018, 444 Pages.

Trummer, et al., "SkinnerDB: Regret-Bounded Query Evaluation via Reinforcement Learning", In Proceedings of the International Conference on Management of Data, Jun. 30, 2019, pp. 1153-1170.

Valentin, et al., "DB2 Advisor: An Optimizer Smart Enough to Recommend Its Own Indexes", In Proceedings of 16th International Conference on Data Engineering, Feb. 29, 2000, 10 Pages.

Watkins, et al., "Technical Note Q-Learning", In Journal of Machine Learning, vol. 08, 1992, pp. 279-292.

Whang, Kyu-Youn, "Index selection in relational databases", In Foundations of Data Organization, May 21, 1985, pp. 369-378.

\* cited by examiner

Index Configuration Subsets (Layouts) 700

| C/q | q₁ | q₂ | q₃ |
|---|---|---|---|
| {I₁} | X | | |
| {I₂} | | X | |
| {I₃} | X | | X |
| {I₁, I₂} | | X | X |
| {I₁, I₃} | | | |
| {I₂, I₃} | | | |

702b:

| C/q | q₁ | q₂ | q₃ |
|---|---|---|---|
| {I₁} | X | X | |
| {I₂} | | | X |
| {I₃} | X | | |
| {I₁, I₂} | | X | X |
| {I₁, I₃} | X | | |
| {I₂, I₃} | | | |

702c:

| C/q | q₁ | q₂ | q₃ |
|---|---|---|---|
| {I₁} | X | | |
| {I₂} | | X | |
| {I₃} | | X | |
| {I₁, I₂} | X | | |
| {I₁, I₃} | X | X | |
| {I₂, I₃} | X | X | |

| C/q | q₁ | q₂ | q₃ |
|---|---|---|---|
| {I₁} | c(q₁, I₁) | d(q₂, I₁) | d(q₃, I₁) |
| {I₂} | d(q₁, I₂) | c(q₂, I₂) | c(q₃, I₂) |
| {I₃} | d(q₁, I₃) | c(q₂, I₃) | d(q₃, I₃) |
| {I₁, I₂} | c(q₁, I₁, I₂) | d(q₂, I₁/I₂) | c(q₃, I₁/I₂) |
| {I₁, I₃} | d(q₁, I₂/I₃) | d(q₂, I₂/I₃) | c(q₃, I₂/I₃) |
| {I₁, I₂, I₃} | d(q₁, I₁/I₂/I₃) | d(q₂, I₁/I₂/I₃) | d(q₃, I₁/I₂/I₃) |

CONSTRAINT-BASED INDEX TUNING IN DATABASE MANAGEMENT SYSTEMS UTILIZING REINFORCEMENT LEARNING

CROSS-REFERENCE TO RELATED APPLICATIONS

This application claims the benefit of and priority to U.S. Provisional Application No. 63/325,538 filed Mar. 30, 2022, the entirety of which is incorporated herein by reference.

BACKGROUND

Recent years have seen a significant rise in the use of computing devices to create, store, and process data. Indeed, tools and applications for maintaining and querying datasets and database systems are becoming more common. As databases become larger and more complex, conventional tools and techniques for querying databases have become inefficient and increasingly expensive, especially, in the area of index tuning.

In general, index tuning is a process that aims to find the optimal index configuration for an input workload (i.e., a set of database queries). Index tuning is often a resource-intensive task since that requires making multiple expensive "what-if" calls to a query optimizer that estimates the cost of a query given an index configuration without actually building the indexes. For conventional database systems, index tuning comes with high operational costs and is impractical when scaled for service providers that host larger databases (e.g., thousands to millions of databases). Further, index tuning can interfere with the execution of other services and productions on the same computing device.

BRIEF DESCRIPTION OF THE DRAWINGS

The detailed description provides one or more implementations with additional specificity and detail through the use of the accompanying drawings, as briefly described below.

FIGS. 7A-7B illustrate an example of generating index configuration subsets shown as budget allocation matrices in accordance with one or more implementations.

DETAILED DESCRIPTION

Figure 1:
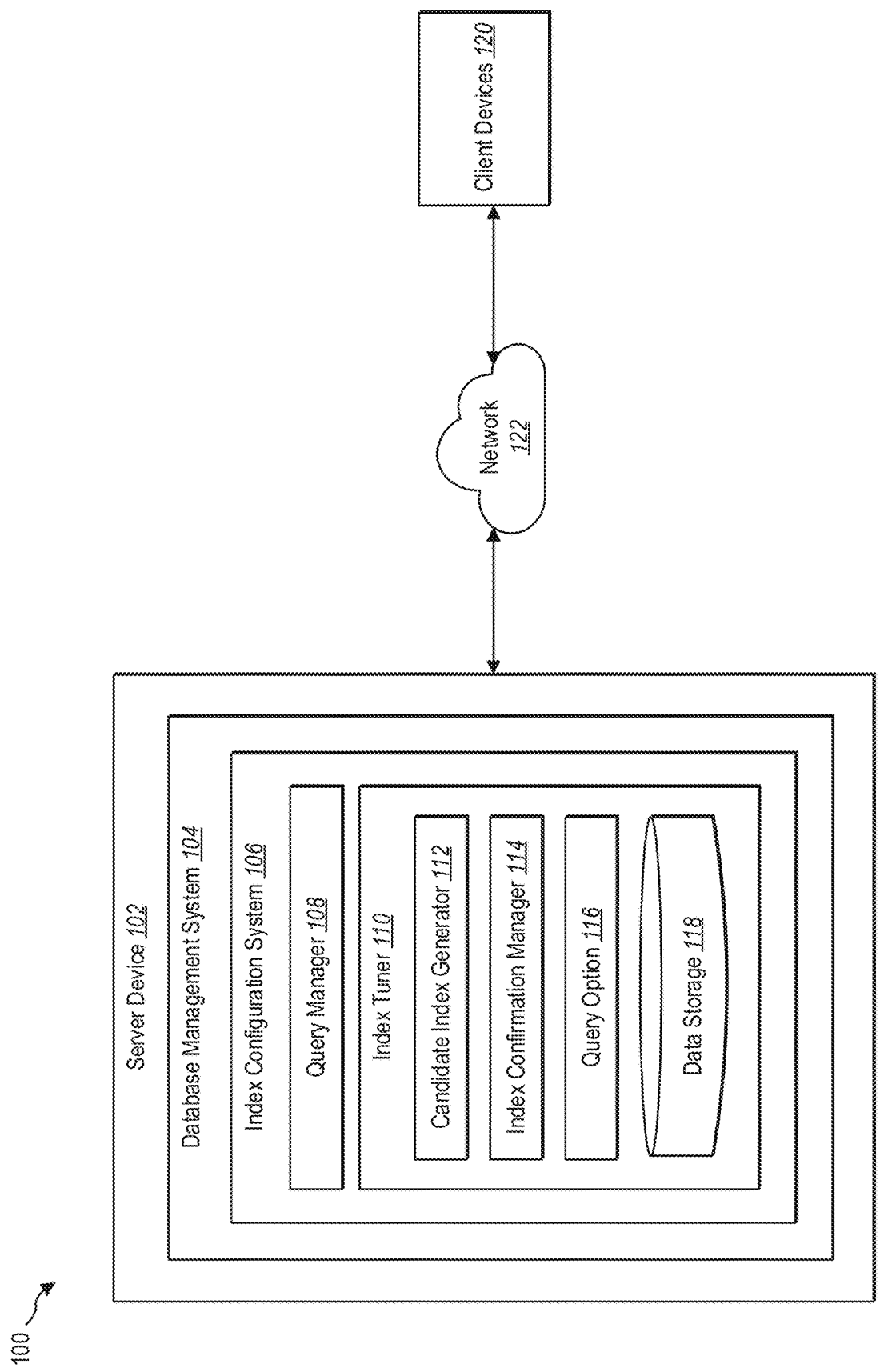
FIG. 1 illustrates a diagram of a computing system environment including a database management system and an index configuration system in accordance with one or more implementations.

Implementations of the present disclosure provide benefits and/or solve one or more of the foregoing or other problems in the art with systems, non-transitory computer-readable media, and methods that determine optimal index configurations for processing workloads in a database management system. For instance, an index configuration system can efficiently determine a subset of table indexes for processing a workload request utilizing one or more reinforcement learning models. For example, in various implementations, the index configuration system utilizes a Markov decision process and/or a Monte Carlo tree search model to determine an optimal subset of indexes for processing a workload in a manner that effectively utilizes computing device resources while also avoiding significant interference with other processing jobs. In some implementations, the index configuration system effectively utilizes server resources to avoid significant interference with the other processing jobs (e.g., customer workload) as well as utilize a constraint-based index tuning to further improve computing processing.

To illustrate, in one or more implementations, the index configuration system receives, at an index tuner, a workload that includes a set of queries corresponding to one database. In addition, the index configuration system generates, via the index tuner, a set of proposed indexes based on the set of queries, where the set of proposed indexes includes combinations of multiple proposed indexes. In some implementations, the index configuration system also determines, via the index tuner, an index configuration from the set of proposed indexes by identifying a plurality of index configurations from the set of proposed indexes utilizing one or more reinforcement learning models, determining workload computing costs for a subset of the plurality of index configurations based on a query optimizer and a tuning constraint (e.g., a number of "what if" calls), and selecting the index configuration from the plurality of index configurations based on the workload computing costs, where the index configuration includes a subset of proposed indexes. Further, the index configuration system can provide the subset of proposed indexes in response to receiving the workload.

In various implementations, the index configuration system utilizes one or more reinforcement learning models that include a Markov decision process having state transitions, actions, and rewards. In some implementations, the one or more reinforcement learning models include a Monte Carlo tree search model that follows the state transitions of the Markov decision process to identify the plurality of index configurations from the set of proposed indexes.

By way of context, index tuning aims to find the optimal index configuration for an input workload. However, index tuning can cause issues in relational database systems (i.e., a database management system). In some instances, index tuning can include a combinatorial optimization problem for determining the best subset of indexes (e.g., index configuration) from a range of candidate index configurations. Index tuning has become important today in the context of database as a service (DBaaS). Additionally, many cloud providers offer DBaaS, which utilizes index tuning.

Recently, some cloud computing systems have started providing index tuning to improve query performance on their databases. However, as noted above, index tuning can come with a high operational cost and is not practical at scale for service providers that may host large numbers of databases. As a result, in practice index tuning is primarily performed on a production server, which can interfere with the regular execution of the production workload (e.g., other processing jobs). Additionally, in various cases, index tuning faces certain restrictions, processing, and memory limitations.

Additionally, in various implementations, index tuning includes components of generating candidate indexes and enumerating index configurations. For example, given an input workload, the index configuration system can first generate candidate indexes for each query and then look for the best configuration among the candidate indexes via configuration enumeration. During enumeration, once a configuration is proposed, the index configuration system, via the index tuner, can utilize a query optimizer to estimate the cost of the input workload when using particular indexes.

The possible number of index configurations for a workload can be exponential with respect to the number of candidate indexes. Thus, it is infeasible to have a query optimizer call (i.e., a what-if call) for every configuration enumerated and every query in the workload. Often, a what-if call to the query optimizer is at least as expensive as, if not more expensive than, a regular optimizer call. Some conventional systems attempt to solve this issue by reducing search spaces. However, even for such reduced search spaces, having one what-if call for every configuration and query remains impractical. To illustrate, some conventional systems would require O(mnK) what-if calls (where m is the number of queries in an input workload, n is the number of candidate indexes, and K is the maximum number of indexes allowed by the final configuration returned).

Also, in some implementations, the overhead of having what-if calls often dominates the total overhead (e.g., execution time and memory consumption) of index tuning. Accordingly, since what-if calls consume resources on the database server, some conventional systems may perform index tuning in a resource-governed way, which results in only a small amount of CPU and memory being used by what-if calls. However, this approach means that index tuning will likely take a significant amount of time to process (e.g., an impractical amount of time).

Indeed, unlike conventional systems and their attempted solutions, the index configuration system generates and utilizes an efficient and novel constraint-aware index tuning approach. For instance, in some implementations, the index configuration system utilizes a constraint where the number of what-if calls is predetermined. In various implementations, constraining the number of what-if calls is technically beneficial, such as with DBaaS providers that provide index tuning capabilities. Further, using a constraint-aware index tuning approach can become even more critical in the cloud setting as databases and tables scale.

As provided below, compared to conventional systems, using the number of what-if calls as a constraint has additional technical benefits. To illustrate, it is a much more robust metric compared to other solutions, such as execution time, which is sensitive to runtime environments, especially in cloud databases with multitenancy enabled. In addition, because the time spent on the what-if calls often dominates the index tuning time (e.g., 75% to 93% of the total tuning time based on 1,000 to 5,000 calls), limiting the number of calls can significantly reduce the index tuning time. As a note, the term "budget constraint" as used herein is different from other tuning constraints that are imposed on the outcome of index tuning, such as the maximum number of indexes allowed, the minimum improvement required, etc.

In addition, by effectively allocating the budget on the what-if calls, the index configuration system 106 also significantly improves the quality of the configuration returned by index tuning. In particular, the index configuration system can utilize reinforcement learning to improve the quality of the configuration returned by index tuning. To illustrate, on one hand, the index configuration system would like to allocate more what-if calls to index configurations that contain known promising configurations as subsets (i.e., exploitation). On the other hand, the index configuration system would also like to explore unknown regions in the search space to increase the chance of finding more promising configurations that might have been overlooked (i.e., exploration). Accordingly, the index configuration system utilizes one or more reinforcement learning models to dynamically determine a tradeoff between the goals of exploitation and exploration.

More particularly, to address this tradeoff, in various implementations, the index configuration system utilizes reinforcement learning (RL) models. In one or more implementations, the index configuration system utilizes a Markov decision process (MDP), for instance, to formulate index configuration enumeration and perform searches. In some implementations, the index configuration system also leverages a Monte Carlo tree search (MCTS) by generating a novel adaptation of the classic MCTS framework in the context of index tuning.

In example implementations, the index configuration system utilizes MCTS to run several simulations (called episodes) and allocates one what-if call to each episode. Additionally, the index configuration system can adopt new strategies and policies, tailored for index tuning, to control the overall search and budget allocation process within each episode of MCTS, based on findings from experiments over standard benchmarks and real-world workloads.

As noted above, the present disclosure provides several practical applications that provide benefits and/or solve problems associated with index tuning. In particular, the index configuration system significantly reduces the processing required by computing devices to determine optimal or near-optimal index configurations (e.g., a subset of indexes) with respect to input workloads. Indeed, by utilizing a tuning constraint (e.g., a number of what-if calls) in connection with reinforcement learning models, the index configuration system can significantly outperform alternative budget-aware solutions in terms of the determining optimal index configurations (e.g., based on both standard industry benchmarks and real-world workloads) as well as improving computing device efficiency.

As illustrated in the foregoing discussion, the present disclosure utilizes a variety of terms to describe the features and advantages of one or more implementations of the index configuration system described herein. For example, as used herein, an "index," "dataset," and/or "table" may refer to a set of data or a subset of data from a database including multiple datasets. For example, as used herein, a dataset may refer to a set of tables or relations of a database (e.g., a relational database). An index may refer to a listing of keys and corresponding entries from a dataset, table, or database. A "candidate index" may refer to a proposed or hypothetical index not yet built.

A "workload" may refer to a set of queries. In various implementations, the queries are weighted, for example, based on priority, importance, and/or other weights. A "query" may refer to a request or other command(s) including operators for obtaining data from one or more datasets. In one or more implementations described herein, a query refers to a request in a database-aware format indicating how to get select information from one or more datasets. A query may be in a query language interpretable by an interface of a database system. A query may include operators and conditions (e.g., join conditions) indicating conditions for accessing or otherwise managing data from one or more datasets.

The terms "candidate index" or "set of candidate indexes" may refer to various indexes from databases corresponding to a workload. In some implementations, candidate indexes include all potential or proposed indexes based on queries in a workload. Additionally, an "index configuration" may refer to a subset of indexes from the candidate index. Thus, in some implementations, the index configuration system can generate various index configurations from a set of candidate indexes (existing or non-existing/proposed) that correspond to a workload.

In various implementations, a "reinforcement learning model" (i.e., RL models) refers to a model that determines future states based on current states and actions to take. Examples of RL models include Monte Carlo tree search models. In some implementations, the index configuration system utilizes multiple RL models together (e.g., nested RL models). While this disclosure focuses on Monte Carlo tree search models, other RL models can be similarly used.

Additional detail will now be provided regarding an index configuration system for determining an optimal subset of indexes for a workload within a database management system. For example, FIG. 1 illustrates a schematic diagram of an environment 100 (i.e., a digital medium system environment) for implementing a database management system 104 on a server device 102. As shown, the database management system 104 (e.g., a relational database system) may include an index configuration system 106. As will be discussed further, the index configuration system 106 may generate and optimize a subset of indexes for performing a workload of one or more received queries. In various implementations, the index tuner 110 utilizes one or more reinforcement learning models to determine an ideal or optimal subset of indexes from candidate indexes, where the subset of indexes corresponds to an index configuration.

In some implementations, the server device 102 is part of a cloud computing system. In addition, the server device 102 represents multiple server devices. In some implementations, the server device 102 hosts one or more virtual networks on which the database management system 104 is implemented.

As shown, the environment 100 also includes a client device 120 connected to the server device 102 via a network 122. For example, the client device 120 makes database query requests to the database management system 104 (e.g., a relational database system). In some implementations, the client device 120 is an administrator device accessing the database management system 104. Additional detail regarding these computing devices and networks is provided below in connection with FIG. 9.

In various implementations, the database management system 104 may include features and functionality that enable users associated with the client devices 120 to submit queries to the database management system 104 (e.g., a relational database system) for processing and for selectively accessing data in accordance with operators indicated within respective queries. For example, the database management system 104 receives a query from the client device 120 (e.g., via the network 122). The query may include operators and conditions indicating characteristics and other conditions of data from various datasets that satisfy the criteria of the query. The query may refer to a decision support query and indicate specifics of a request from a client device for a subset of data from a database including any number of datasets (e.g., tables, columns, rows of data).

In one or more implementations, the client device 120 submits a query having a particular format or vocabulary that the database management system 104 is equipped to understand. For example, a user of the client device 120 may enter a query having a query language format that the database management system 104 can receive and interpret. In one or more implementations, the user of the client device 120 interacts with selectable options on a graphical user interface using an application on the client device 120 and/or database management system 104 that is aware of particulars of the database and which enables a user to indicate operators and/or join conditions in creating a query for transmission to the database management system 104.

The index configuration system 106 can include various components, such as a query manager 108, an index tuner 110 having a candidate index generator 112 and an index configuration manager 114, a query optimizer 116, and a data storage 118. In one or more implementations, one or more of the components are physical. In some implementations, one or more of the components are virtual. Additionally, in example implementations, one or more of the components are located on a separate device from other components of the index configuration system 106. For instance, the index tuner 110 is located separately from the query optimizer 116 and/or the data storage 118.

As shown, the index configuration system 106 includes the query manager 108. In various implementations, the query manager 108 receives, accesses, provides, edits, modifies, identifies, creates, or otherwise manages queries. For example, the query manager 108 receives a workload that includes a set of queries. In some implementations, the query manager 108 identifies query weights associated with queries in a workload indicating a query ranking or priority, as noted above. In certain implementations, the query manager 108 also provides results of a workload request to the device or system that sent the request.

As shown, the index configuration system 106 includes the index tuner 110. The index tuner 110 can determine one or more sets of indexes (and/or subsets) to utilize and/or create in connection with an incoming workload. As shown, the index tuner 110 includes the candidate index generator 112, which can generate a list of candidate indexes corresponding to a workload. Further, the index tuner 110 includes index configuration manager 114 that determines enumerations of index configurations (e.g., subsets of indexes) corresponding to the workload. Additional detail regarding the index tuner 110 is provided below with respect to FIG. 3.

As shown, the index configuration system 106 includes the index tuner 110. The index tuner 110 can determine one or more sets of indexes (or subsets) to utilize and/or create in connection with an incoming workload. As shown, the index tuner 110 includes the candidate index generator 112, which can generate a list of candidate indexes corresponding to a workload. Further, the index tuner 110 includes the index configuration manager 114, which determines enumerations of index configurations (e.g., subsets of indexes) corresponding to the workload. Additional detail regarding the index tuner 110 is provided below with respect to FIG. 3.

As shown, the index configuration system 106 includes the query optimizer 116. The query optimizer 116 can determine the cost of a workload (e.g., workload cost estimates) given an index configuration and one or more queries. For example, the query optimizer 116 determines the cost of a "what-if" optimizer call, which determines the cost of an input workload (e.g., workload cost estimates) when using a subset of proposed indexes in a given configuration for a query without building the proposed indexes (e.g., what-if cost estimation calls). Additional detail regarding the query optimizer 116 is provided below with respect to FIG. 3.

Additionally, as shown in FIG. 1, the index configuration system 106 includes the data storage 118. In various implementations, the data storage 118 can include any data used by any of the components of the database management system 104 in performing features and functionality described herein. For example, the data storage 118 may include datasets and/or databases of a database system (e.g., a commercial database system). In addition, the data storage index tuning constraints may include models for determining optimal index configurations and/or subsets of indexes corresponding to workloads. For example, the data storage index tuning constraints may include storage of algorithms described herein corresponding to one or more reinforcement learning models, such as a Monte Carlo search tree model. While shown in the index configuration system 106, the data storage index tuning constraints may be implemented elsewhere on the server device 102 or another device.

As shown in FIG. 1, the server device 102 and the client device 120 (e.g., hardware and/or software clients) can communicate with each other directly or indirectly through the network 122. The network 122 may include one or multiple networks and may use one or more communication platforms or technologies for transmitting data. The network 122 may refer to any data link that enables the transport of electronic data between devices and/or modules of the example environment 100 shown in FIG. 1. The network 122 may refer to a hardwired network (e.g., where a client accesses the database management system directly), a wireless network (e.g., where the client devices communicate with the server device(s) over a wireless network), or a combination of hardwired and wireless networks. In one or more implementations, the network includes the Internet.

The server device 102 and/or the client device 120 may refer to various types of computing devices. As an example, one or more of the client devices 120 may include a mobile device, such as a mobile telephone, a smartphone, a PDA, a tablet, or a laptop. Additionally, or in the alternative, one or more of the client devices 120 may include a non-mobile device such as a desktop computer, server device, or another non-portable device. Each of the server device 102 and the client device 120 may include features and functionality described below in connection with an example computing device illustrated in FIG. 9.

Figure 2:
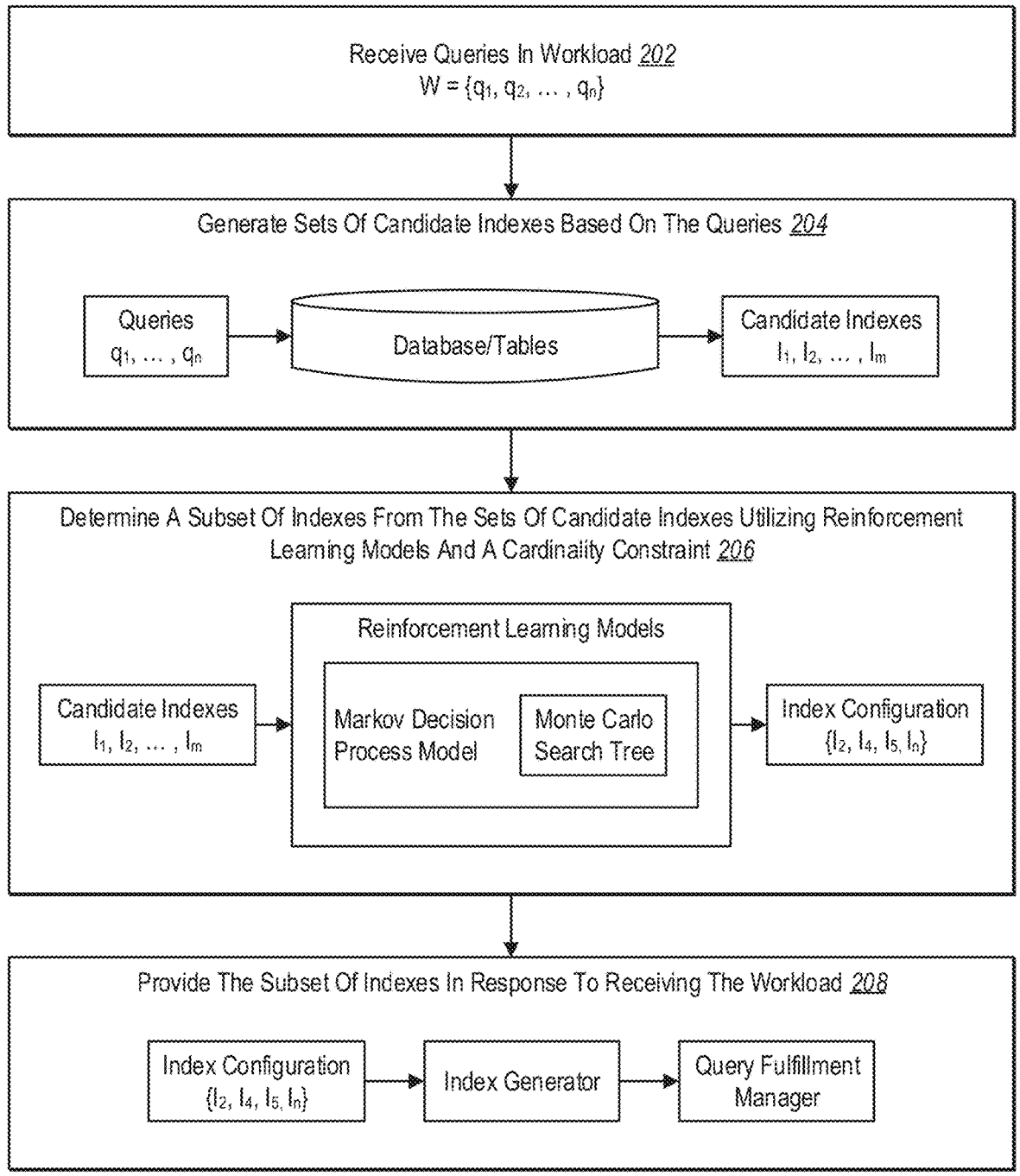
FIG. 2 illustrates an example workflow for generating an optimized index configuration for a workload in accordance with one or more implementations.

Additional detail in connection with an example implementation of the index configuration system 106 is discussed in connection with FIG. 2. For example, FIG. 2 illustrates an example workflow for generating an optimized index configuration for a workload in accordance with one or more implementations. As shown, FIG. 2 illustrates a series of acts 200 of the index configuration system 106 improving index tuning by determining an optimal subset of indexes corresponding to a workload.

As shown in FIG. 2, the series of acts 200 includes an act 202 of receiving queries in a workload. For example, a computing device, system, engine, or component requests access to information stored in one or more databases and/or tables. As such, the index configuration system 106 receives a workload that includes multiple queries.

As shown, the series of acts 200 also includes an act 204 of generating sets of candidate indexes based on the queries. For example, in various implementations, the index configuration system 106 analyzes the queries in the workload to determine one or more sets of candidate indexes that potentially could be used to access the requested data. In several implementations, a candidate index refers to an index of a table or a database not yet created. In some implementations, the index configuration system 106 utilizes the candidate index generator 112 to generate the sets of candidate indexes. Additional detail regarding generating candidate indexes is provided below in connection with FIG. 4.

As shown, the series of acts 200 also includes an act 206 of determining a subset of indexes from the set of candidate indexes using reinforcement learning models and a cardinality constraint (e.g., an index tuning constraint). For example, in one or more implementations, the index configuration system 106 determines an index configuration that includes an optimal subset of the indexes for processing the workload.

In some implementations, the index configuration system 106 utilizes reinforcement learning models, such as a Monte Carlo tree search model to determine one or more layouts (e.g., candidate index configurations), which are provided to a query optimizer to determine workload costs given the various index configurations. Additionally, the index configuration system 106 utilizes the index tuning constraint to limit the number of what-if calls made to the query optimizer. For instance, the tuning constraint defines a predetermined number of what-if calls that can be made to a query optimizer for a workload. In this manner, when the number of what-if calls to the query optimizer for a workload is greater than the predetermined number of what-if calls the index configuration system 106 limits or restricts the number of calls. Further, utilizing the workload costs, the index configuration system 106 can determine the best (e.g., optimal) index configuration to process the workload.

As shown, the series of acts 200 also includes an act 208 of providing the subset of indexes in response to receiving the workload. For example, the index configuration system 106 identifies or otherwise extracts the subset of indexes from the optimal index configuration. Further, the index configuration system 106 returns the subset of indexes response to receiving the workload. In some implementations, the index configuration system 106 can also generate one or more of the indexes in the subset of indexes.

Figure 3:
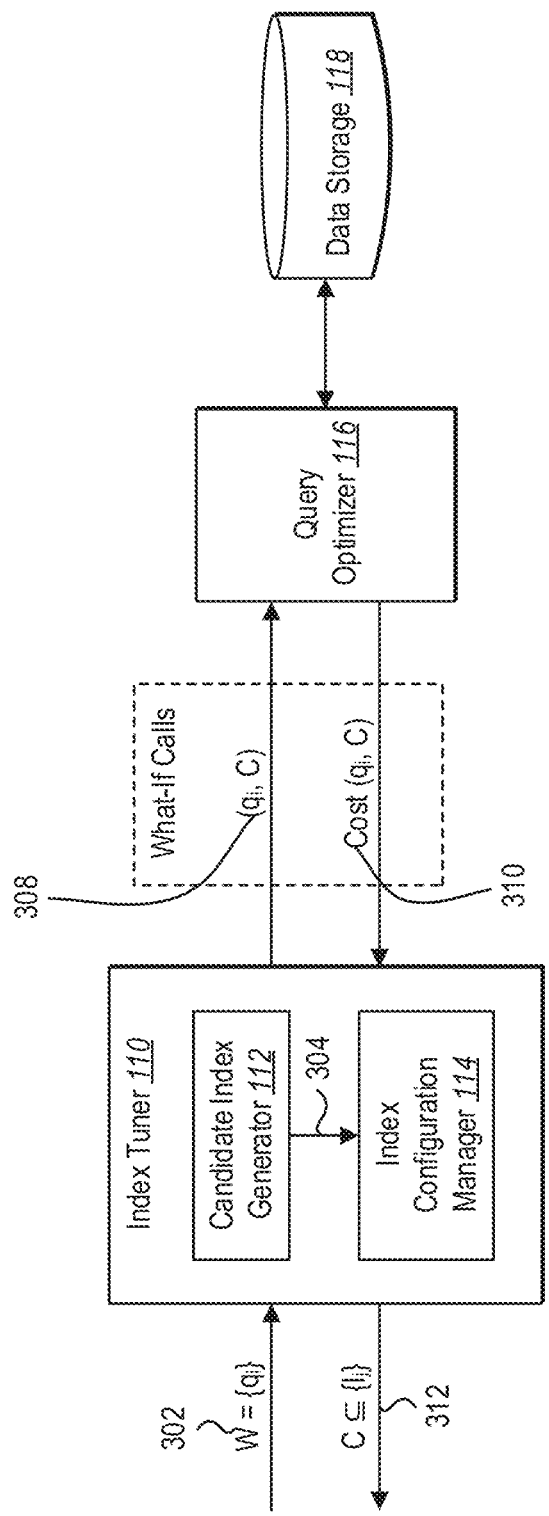
FIG. 3 illustrates an example architecture of generating an optimized index configuration for a workload in accordance with one or more implementations.

As noted above, FIG. 3 illustrates an example architecture of generating an optimal index configuration for a workload in accordance with one or more implementations. As shown, FIG. 3 includes various components introduced above, such as the index tuner 110 having the candidate index generator 112 and the index configuration manager 114 as well as the query optimizer 116. In addition, FIG. 3 includes the data storage 118 (e.g., a database of tables, indexes, references, information, and other relational data). In various implementations, the data storage 118 is a database (e.g., a database that includes only a portion of the data storage 118 provided in FIG. 1). FIG. 3 also includes an input workload 302 having a set of queries (i.e., "$\{q_i\}$," a "what-if" call 308 based on a query (i.e., "$\{q_i\}$") and an index configuration (i.e., "C"), and costs 310 based on the query and the index configuration.

FIG. 3 outlines a cost-based index tuning architecture. As shown, the index tuner 110 contains two major components, the candidate index generator 112 and the index configuration manager 114. Given an input workload 302 (i.e., W), the index configuration system 106 utilizes the index tuner 110 to first generate candidate indexes 304 for each query (i.e., $q_i$). In addition, $q_i \in W$ represents a single query, "$\{I_j\}$" represents a set of candidate indexes for W, and $C \subseteq \{I_j\}$ represents an (optimal or best) index configuration determined during enumeration by the index configuration manager 114.

Next, the index configuration system 106 can then determine an optimal or near-optimal index configuration among the candidate indexes via configuration enumeration. During enumeration, once an index configuration C is proposed, the index tuner 110 consults the query optimizer 116 (e.g., a "what if" API of the query optimizer 116) to estimate a cost 310 of the input workload 302 when using indexes in index configuration C without building the indexes (e.g., proposed indexes). As shown, the index tuner 110 sends a "what-if" call 308 (i.e., a "what-if" optimizer call) to the query optimizer 116. Additionally, the index tuner 110 may send multiple "what-if" calls corresponding to multiple queries and/or based on multiple configurations.

In various implementations, the index configuration system 106 determines the best (e.g., optimal or near-optimal) index configuration (e.g., index configuration C) as the index configuration having the lowest estimated "what-if" cost found during enumeration, which is provided in response to the input workload 302 request. In some implementations, the index configuration system 106 also applies one or more user-specified constraints and/or other constraints, as provided below. In addition, in one or more implementations, the index configuration system 106 utilizes a caching layer to cache the "what-if" calls for efficient reuse.

Further, the index configuration system 106 provides index configuration C as output 312 in response to the input workload 302 request. More particularly, in various implementations, the index configuration system 106 provides the subset of candidate indexes within index configuration C in response to receiving the workload.

In various implementations, the candidate index generator 112 generates a set of candidate indexes by looking for the indexable columns for each query in the input workload 302. For example, the candidate index generator 112 takes the union as the candidate indexes for the entire workload. Stated differently, for each query in the input workload 302, the candidate index generator 112 determines available candidate/proposed indexes for improved access to data in the data storage 118. An example of generating candidate indexes is provided below in connection with FIG. 4.

In addition, in one or more implementations, the index configuration manager 114 searches for a subset of indexes (i.e., an index configuration) that minimizes the cost 310 of the "what-if" calls corresponding to the input workload 302. For example, the index tuner 110 and/or the index configuration system 106 provides multiple "what-if" calls to the query optimizer 116, which determines optimal database query plans for accessing the requested data as well as determining a cost to access the requested data based on the query and index configuration. Additional details regarding this approach are provided below in connection with FIG. 5 and FIG. 6.

Figure 4:
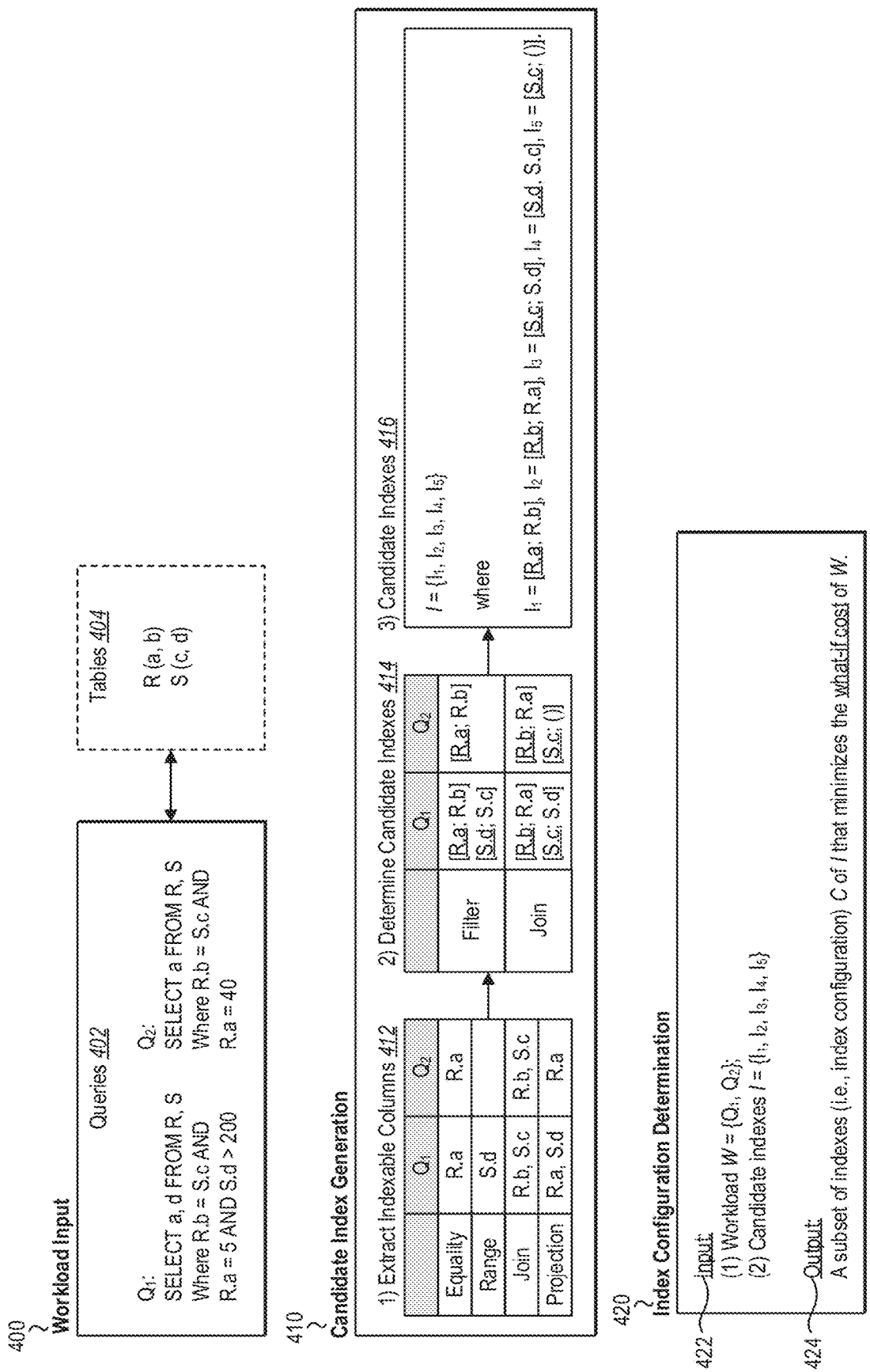
FIG. 4 illustrates example tables of generating candidate indexes for a workload in accordance with one or more implementations.

As mentioned above, FIG. 4 illustrates example tables of generating candidate indexes for a workload in accordance with one or more implementations. More specifically, FIG. 4 includes tables corresponding to the two stages of candidate index generation and index configuration enumeration (i.e., index configuration determination). As shown, FIG. 4 includes various tables, such as a workload input table 400, a candidate index generation table 410, and an index configuration determination table 420. FIG. 4 also includes tables 404 (e.g., tables and databases), which are associated with the workload input table 400. In particular, the tables 404 includes a first table (i.e., Table R) with two columns (i.e., a and b) as well as a second table (i.e., Table S) with two columns (i.e., c and d).

As shown, the workload input table 400 includes queries 402 for accessing data within the tables 404. For example, the index configuration system 106 receives a database request in the form of a workload that includes one or more queries for accessing the requested data. As shown, the queries 402 include two queries, $Q_1$ and $Q_2$. A workload may include an additional or different number of queries. The queries include selection clauses, from clauses, and where clauses corresponding to the tables 404. In various implementations, a query includes a group-by clause, an order-by clause, or other clauses.

In one or more implementations, the index configuration system 106 can generate candidate indexes based on the workload input table 400. Accordingly, the candidate index generation table 410 corresponds to generating candidate indexes for the workload and shows three sub-tables including sub-tables for extracted indexable columns table 412, determined candidate indexes 414, and candidate indexes 416.

In some implementations, the index configuration system 106 generates candidate indexes by identifying columns that serve as the basis of the indexable columns. For example, the index configuration system 106 identifies columns that appear in filter and join predicates in the where clause. Additionally, or in the alternative, the index configuration system 106 identifies columns that appear in the group-by clauses and order-by clauses. The index configuration system 106 can also identify columns that appear in the projection list of the select clause, which sometimes can be included as data/payload columns of a covering index and are useful for "index-only" access paths.

Based on the identified columns, in various implementations, the index configuration system 106 determines candidate indexes for each query based on the extracted indexable columns. Indeed, the index configuration system 106 can take a union of the separate candidate indexes to generate the candidate indexes, as shown in the sub-table of candidate indexes 416. In particular, FIG. 4 shows five candidate indexes, $I_1$-$I_5$ corresponding to the queries 402 in the workload. For simplicity, the example in FIG. 4 focuses on covering indexes where the key columns of the indexes are underscored (e.g., "[S.c; ( )]" is the only non-covering index included).

As shown, the index configuration determination table 420 corresponds to determining index configurations for a workload and includes input 422 and output 424. In various implementations, the index configuration system 106 utilizes the candidate indexes as part of the input 422 to the index configuration enumeration process in determining the best index configuration (e.g., a subset of candidate indexes) for the workload with minimum what-if optimizer cost (e.g., the output 424), which is further described below.

In various implementations, the index configuration system 106 utilizes the index tuning architecture outlined in FIG. 3 to accomplish the index configuration enumeration process to tune indexes for analytical workloads (e.g., TPC-H and TPC-DS). Additionally, in one or more implementations, the index configuration system 106 employs a classic greedy search algorithm as part of the index configuration enumeration process.

Algorithm 1, shown below, provides an example of the algorithm that employs the greedy algorithm:

---
Algorithm 1: The Greedy algorithm for configuration enumeration in the index tuning architecture is shown in FIG. 1.
---
Input: W, the workload; I, the candidate indexes; K: the cardinality constraint
Output: $C^{min}$, the best configuration s.t. $|C^{min}| \leq K$.
1.      $C^{min} \leftarrow \emptyset$, $cost^{min} \leftarrow cost(W, \emptyset)$;
2.      while $I \neq \emptyset$ and $|C^{min}| \leq K$ do
3.         $C \leftarrow C^{min}$, $cost \leftarrow cost^{min}$;
4.         foreach index $I \in I$ do
5.            $C_I \leftarrow C^{min} \cup \{I\}$, $cost\ (W, C_I) \leftarrow \Sigma_{q \in W} cost(q, C_I)$;
6.            if $cost(W, C_I) <$ cost then
7.                $C \leftarrow C_I$, $cost \leftarrow cost(W, C_I)$;
8.         if $cost \geq cost^{min}$ then
9.            return $C^{min}$;
10.        else
11.           $C^{min} \leftarrow C$, $cost^{min} \leftarrow cost$, $I \leftarrow I - C^{min}$;
12.     return $C^{min}$;

---

Starting with the understanding of how the greedy algorithm can be adapted in a budget-constrained context, it can be seen that cost approximation appears unavoidable in this setting as it is infeasible to have one what-if call for every configuration enumerated and every query in the workload. Therefore, the index configuration system 106 applies a cost approximation to the index enumeration process that includes formulations, as provided below. For simplicity, this disclosure describes various budget-aware implementations that include variants of the greedy search algorithm.

In addition, in one or more implementations, the index configuration system 106 utilizes a cardinality constraint/index tuning constraint (e.g., K) that constraints or limits the size of the final index configuration to be returned (e.g., imposes a budget), which is further provided below. In some implementations, the index configuration system 106 integrates other user-specified tuning constraints, such as a maximum storage limit into the budget-aware tuning framework disclosed herein.

As noted above, Algorithm 1 (e.g., the greedy search algorithm) does not specify how the cost of a query q given a configuration C (i.e., cost(q, C)) is obtained via approximation approaches other than using the what-if cost (i.e., c(q, C)), which requires what-if calls to the query optimizer 116. Accordingly, in one or more implementations, the index configuration system 106 utilizes a cost derivation method. In these implementations, the cost derivation is indicated as d(q, C), given query q and configuration C. In some instances, the derived cost is defined as the minimum cost over all subset configurations of C with known what-if costs.

Formally, the derived cost can be formulated as d(q, C)≤$min_{S \subseteq C}$(q,S), where c(q, C) may refer to the what-if cost of q with the subset S of indexes. In some instances, the index configuration system 106 applies an assumption that the monotone property of index configuration costs c(q, $C_1$)≤c(q, $C_2$) where $C_1$ and $C_2$ are two index configurations subject to $C_1 \subseteq C_2$, and q is an arbitrary query. Stated differently, by including more indexes into an index configuration, the what-if cost does not increase. This holds when assuming that the query optimizer picks the indexes that lead to the minimum cost of the query.

Also, as shown, the derived cost in many instances is similar or the same as an upper bound on the what-if cost since c(C, q)≤$min_{S \subseteq C}$(q, S). When the what-if cost c(q, C) is known, the index configuration system 106 derives the cost as being the same as the what-if cost (i.e., d(q, C)=c(q, C)). Accordingly, when utilizing the greedy algorithm in a budget-constrained setting, the index configuration system 106 can use the derived cost (i.e., d(q, C)) as a replacement for cost(q, C).

In various implementations, the index configuration system 106 determines an optimal budget-aware index configuration enumeration by addressing the following problem: Given an input workload W with candidate indexes I, a cardinality constraint K (e.g., an index tuning constraint), and a budget B on what-if calls, find an index configuration $C^* \subseteq I$ such that $|C^*| \leq K$ and the derived cost d(W, $C^*$) is minimized (i.e., $C^*$=$argmin_{C \subseteq I, |C| \leq K}$d(W, C)).

In various implementations, the index configuration system 106 may utilize various budget-aware index configuration enumeration algorithms that are heuristic solutions to the optimization problem of selecting an optimal index configuration having a subset of indexes. As further provided below, in various implementations, the index configuration system 106 utilizes the greedy search algorithm and adapts it to be budget-aware. In addition, in one or more implementations, the index configuration system 106 further applies an additional reinforcement learning algorithm based on the Monte Carlo tree search to further improve the optimization process.

As one property of search algorithms such as the greedy algorithm, when combined with cost derivation in a budget-constrained setting, it has an order-insensitive property that allows the index configuration system 106 to focus on the outcome of index configuration layouts (index configuration having different index subset configurations) without utilizing additional resources to process the orders of filling in the cells. Indeed, with the greedy search algorithm, all layouts produce the same outcome and yield the same index configuration.

In some implementations, the index configuration system 106 adapts variants of the greedy search algorithm based on configuration costs observed during a search. Indeed, the index configuration system 106 dynamically determines a trade-off between exploitation and exploration when allocating budget what-if calls. For example, exploitation can include allocating budget to the index configurations that already show promise (e.g., the best index configuration found by the greedy search algorithm so far as a subset). Exploration can include allocating budget to index configurations that have potential (e.g., index configurations that do not contain the best configuration found so far by the greedy search algorithm but that include other configurations with similar costs as subsets).

Accordingly, in various implementations, the index configuration system 106 utilizes reinforcement learning (RL) to make improved decisions regarding the exploitation/exploration trade-off. In some implementations, reinforcement learning aims to maximize cumulative rewards when taking actions in a search space. An example of this is a Markov decision process (MDP).

For example, in one or more implementations, the index configuration system 106 models the index configuration search as an MDP (S, A, P, R) where S represents a set of states, A represents a set of actions, P represents a set of transition probabilities, and R represents a set of rewards. More specifically, in various implementations, a set of states S of the MDP includes all index configurations in the search space. Thus, for a given set of candidate indexes I, the index configuration system 106 can determine $|S|=2^{|I|}$ number of states. For a given state $s \in S$, the index configuration system 106 can determine its set of actions (e.g., A(s)) as the indexes that are not included in s (i.e., A(s)=I−s). Additionally, regarding transition probabilities, for a given state s (i.e., index configuration) at time t, the index configuration system 106 can select the action (i.e., select an index to include within the index configuration) as $a \in A(s)$. The index configuration system 106 represents the state in the next time period as s' at t+1. In these implementations, the index configuration system 106 determines the transition probabilities P as $Pr(s_{t+1}=s'|s_t=s, a_t=a)$ by the definition of MDP. In the context of index tuning, the next state s' can be a deterministic function given s and a, (i.e., s'=ƒ(s, a)=s∪{$a_j$}). As a result, the transition probabilities are of a special form where $Pr(s_{t+1}=f(s, a)|s_t=s, a_t=a)=1$ and 0 otherwise, for all s, a, and t.

Additionally, for rewards and expected returns, in various implementations, the index configuration system 106 determines the expected return of a state s (with respect to a given policy π) as the expected cumulative reward when starting from s and following the policy π(as provided below, a policy π(a|s) indicates the action a that should be taken at the state s). In example implementations, within the RL framework, the expected return is a state-value function, denoted as $V_\pi(s)$. In some implementations, the expected return is an action value function, denoted as $Q_\pi(s, a)$, which indicates the expected return when the index configuration system 106 starts at s, takes the action a, and follows the policy π.

In various implementations, the goal of RL is to find an optimal policy π* that maximizes the state-value function, denoted as V*(s). π* also maximizes the action-value function, denoted as Q*(s, a). As a result, to find π*, the index configuration system 106 can maximize either $V_\pi(s)$ or $Q_\pi(s, a)$. In one or more implementations, the index configuration system 106 utilizes RL to maximize the expected return (as encoded by the state/action value function) by defining the expected return of a state s as the expected percentage improvement of index configurations that contain s as a subset. Specifically, the index configuration system 106 determines the percentage improvement of an index configuration C of a workload W as $$\eta(W, C) = \left(1 - \frac{\text{cost}(W, C)}{\text{cost}(W, \phi)}\right) \times 100\%$$

In the above equation, cost(W, C)=$\Sigma_{q \in W}$ cost(q, C). In budget-aware index tuning, the index configuration system 106 may not evaluate cost(W, C) precisely by using the what-if costs due to budget constraints. Rather, the index configuration system 106 utilizes derived costs, denoted as d(W,C)=$\Sigma_{q \in W}$ d(q, C) as an approximation.

Figure 5:
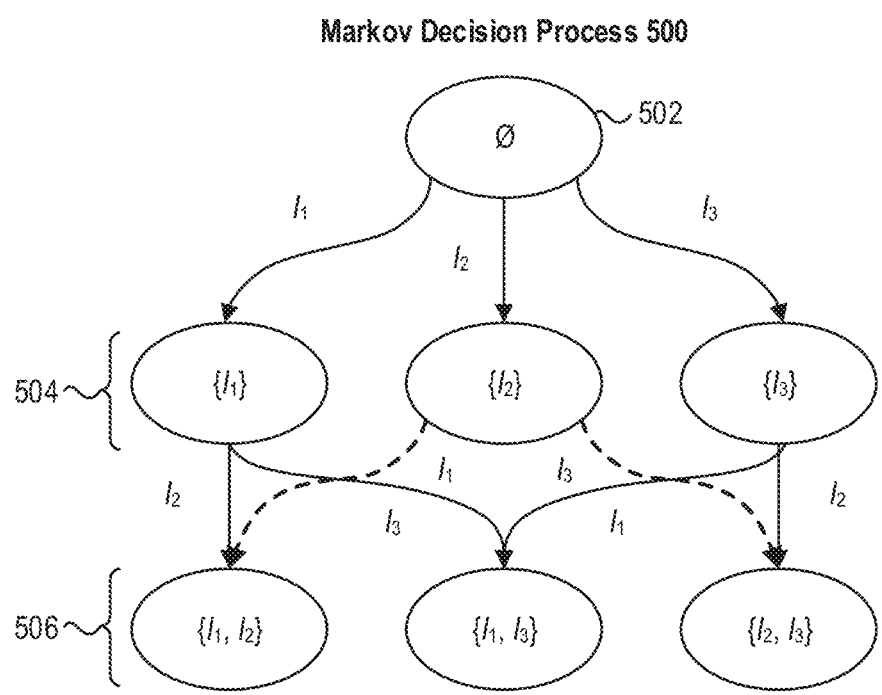
FIG. 5 illustrates an example of a Markov decision process (MDP) model for index tuning in accordance with one or more implementations.

To illustrate, FIG. 5 illustrates an example of a Markov decision process 500 for index tuning in accordance with one or more implementations. As shown, FIG. 5 includes an existing index configuration 502 (represented as ∅), a search space with three candidate indexes {$I_1, I_2, I_3$} (e.g., proposed or candidate indexes), and cardinality constraint K=2. For simplicity, FIG. 5 shows state transitions with nonzero probabilities and omits the rewards to avoid clutter.

As shown, the index configuration system 106 can move from the existing index configuration 502 to a first index configuration 504 that includes either the first candidate index {$I_1$}, the second candidate index {$I_2$}, or the third candidate index {$I_3$}. Next, the index configuration system 106 can advance to a second index configuration 506 that adds an additional index, as shown. However, based on the cardinality constraint (e.g., K=2), the index configuration system 106 is unable to further expand the states by adding more indexes without violating the cardinality constraint. In some instances, states without outgoing transitions are called terminal states.

In some implementations, when the state space S is small, the index configuration system 106 can use dynamic programming to find V*(s) or Q*(s, a) based on the recursive relationships between the state/action values. In many implementations, dynamic programming is infeasible for a large state/action space, which is commonly the case when tuning large workloads. In these implementations, the computation time and amount of memory required to run dynamic programming to compute $V_\pi(s)$ or $Q_\pi(s, a)$ would be infeasible. Thus, in these implementations, the index configuration system 106 can pursue additional solutions for such MDP problems.

To illustrate, in various implementations, the index configuration system 106 adapts a Monte Carlo tree search (MCTS) to solve the above problem. Indeed, in some implementations, the index configuration system 106 utilizes an RL-based technology that does not require explicitly representing the entire state/action space to address scalability challenges.

At a high level, MCTS is a simulation-based RL technology that estimates the action value function Q(s, a) using sampled traces by following the state transitions in the MDP. However, in many implementations, by utilizing MCTS, the index configuration system 106 does not need to estimate Q(s, a) for all state-action pairs (s, a). Rather, the index configuration system 106 focuses on state-action pairs that show promise in the long run. Indeed, the index configuration system 106 can achieve progressive pruning by decoupling pairs and narrowing down the search space.

To illustrate, in one or more implementations, utilizing MCTS, the index configuration system 106 organizes the entire search space using a tree structure. For example, each node in the tree represents a state (i.e., index configuration) in the MDP and each outgoing edge of a node represents an action (i.e., the next index to be included) of the state. The index configuration system 106 can then utilize MCTS to run several episodes that progressively expand the search tree and sample configurations. In each episode, the index configuration system 106 starts from the root of the tree and executes a series of steps (i.e., selection, expansion, simulation, and updating), as described below and shown in FIG. 6.

To elaborate, in one or more implementations, the index configuration system 106 performs a selection step by selecting an outgoing edge (i.e., an action) from the current node (i.e., the current state) based on some action selection policy (described below). In some implementations, the index configuration system 106 visits the corresponding child node (i.e., the next state) by following the selected edge.

Additionally, in some implementations, the index configuration system 106 performs an expansion step. For example, if the current node is a leaf that has been visited, the index configuration system 106 expands the search tree by following the edge selected and adding the node that represents the next state. In example implementations, the index configuration system 106 performs a simulation step. For instance, after reaching a leaf that does not represent a terminal state and that has not been visited yet, the index configuration system 106 performs a rollout by randomly adding indexes into the configuration represented by the leaf. In certain implementations, the index configuration system 106 performs an update step by evaluating the configuration returned by the rollout to obtain its what-if cost. Further, the index configuration system 106 utilizes the what-if costs to update the average reward of every node along the path from the root to the leaf.

Figure 6:
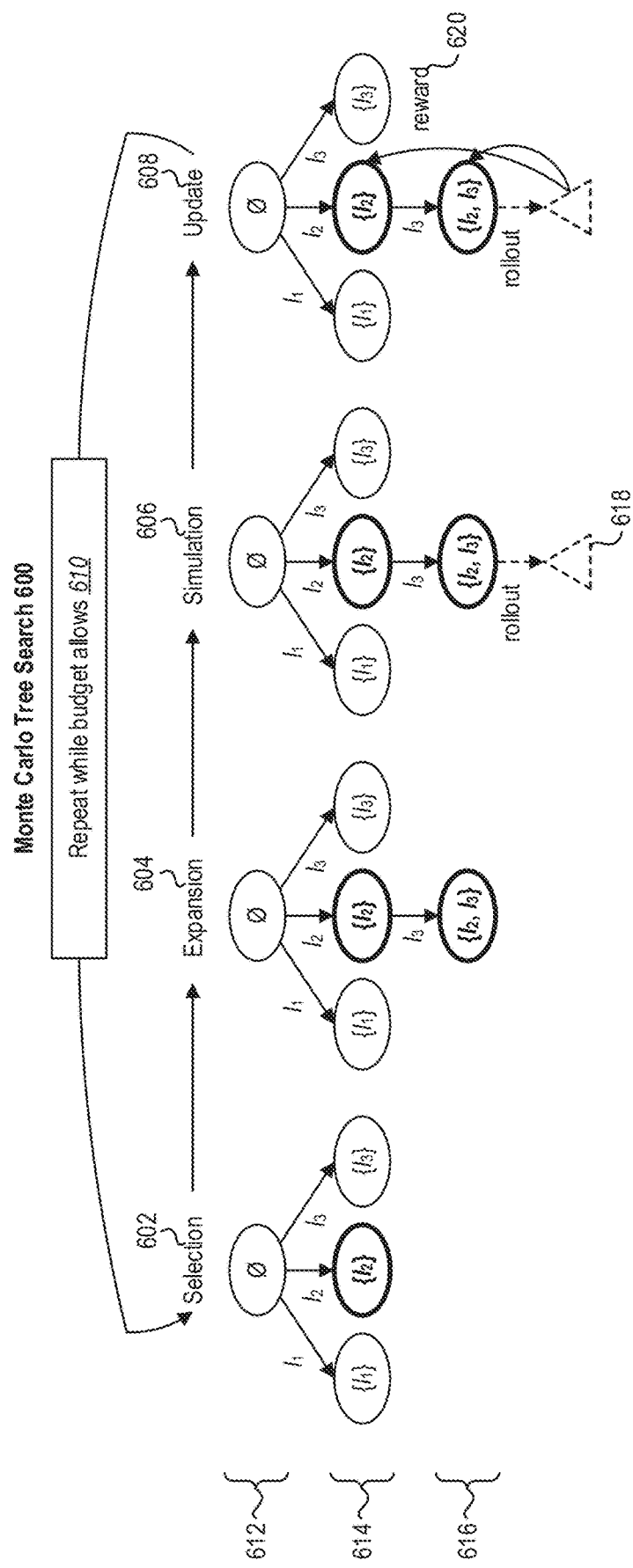
FIG. 6 illustrates an example of a Monte Carlo tree search (MSTS) model for index tuning in accordance with one or more implementations.

To illustrate, FIG. 6 shows an example of a Monte Carlo tree search model 600 for index tuning in accordance with one or more implementations. As shown, FIG. 6 includes a search space with candidate indexes $\{I_1, I_2, I_3\}$, as introduced above. FIG. 6 also includes four steps in one episode of MCTS. In addition, FIG. 6 includes index configurations 612 (represented as $\emptyset$), a first index configuration 614, and a second index configuration 616.

As shown, the index configuration system 106 performs a selection step 602 by beginning from the root and selecting an index (e.g., action $\{I_2\}$) based on an action selection policy. Since $\{I_2\}$ is a leaf that has been previously visited, the index configuration system 106 performs the expansion step 604. In particular, the index configuration system 106 expands the index configuration by picking an additional index (e.g., action $\{I_3\}$, which results in the new (leaf) state $\{I_2, I_3\}$ into the search tree.

Further, the index configuration system 106 performs the simulation step 606 by visiting (recursively) this new leaf. Since the index configuration system 106 has not previously visited the new leaf, the index configuration system 106 runs a rollout 618 to estimate its average return. In addition, the index configuration system 106 performs the update step 608 by updating the average returns for the states/actions along the path from the root to the leaf (i.e., $\{I_2\}$ and $\{I_2, I_3\}$) with the reward 620 observed on the sampled index configuration by the rollout. Additionally, the index configuration system 106 performs the step 610 of repeating steps 602-608 while the budget allows (e.g., until the number of iterations in the index tuning constraint is met).

To further illustrate, Algorithm 2 presents a formal description of the index configuration system 106 adapting the MCST framework to the MDP problem for an index configuration search.

Algorithm 2: MCTS for budget-aware index tuning

Input: W, the workload, I, the candidate indexes; K: the cardinality constraint; B, the budget.
Output: $C^{min}$, the best index configuration s.t. $|C^{min}| \leq K$.
1.  Main:
2.  $S_0 \leftarrow$ CreateNode($\emptyset$, I), b $\leftarrow$ B;
3.  while b > 0 do
4.  b $\leftarrow$ RunEpisode($s_0$, b, W, K);
5.  $C^{min} \leftarrow$ ExtractBestConfiguration($s_0$);

Algorithm 2: MCTS for budget-aware index tuning 6.  return $C^{min}$;
7.  
8.  RunEpisode(s: state, b: budget, W, K)
9.  C $\leftarrow$ SampleConfiguration(s, K);
10. (cost (W, C), b') $\leftarrow$ EvaluateCostWithBudget(W, C, b);
11. $\eta(W, C) \leftarrow \left(1 - \frac{cost(W, C)}{cost(W, \emptyset)}\right) \times 100\%;$
12. foreach state s' in the path that leads to C do
13. Update the average reward of s' with $\eta(W, C)$;
14. return b';
15. 
16. SampleConfiguration(s: state, K)
17. if s is leaf then
18. if s has not been visited before then
19. return Rollout(s);
20. else if s is a terminal state, i.e., $|s| == K$ then
21. return s;
22. a $\leftarrow$ SelectAction(s);
23. s' $\leftarrow$ GetOrCreateNextStat(s, a);
24. return SampleConfiguration(s', K);

Algorithm 2 includes various functions, some of which are further discussed below. For example, the CreateNode Function is where the index configuration system 106 takes a configuration C and the candidate indexes I as inputs, and it creates a new node in the search tree that represents the state s corresponding to C. Meanwhile, the index configuration system 106 initializes the action set A(s) of s, which includes all candidate indexes that are not covered by C (i.e., A(s)=I−C). Moreover, the index configuration system 106 initializes bookkeeping information for each action a∈A(s) with respect to the action selection policy (provided below).

As another example, the EvaluateCostWithBudget Function is where the index configuration system 106 allocates the budget. In various implementations, the index configuration system 106 selects one query q and utilizes its what-if cost for cost(q, C). For the rest of the workload, the index configuration system 106 utilizes a cost derivation (i.e., cost(W, C)←c(q, C)+$\Sigma_{q' \in W, q' \neq q}$ d(q', C)). In some implementations, the index configuration system 106 currently picks the query q with probability proportional to its derived cost, though other strategies are possible. In some instances, the remaining budget b'←b−1.

As an additional example, the GetOrCreateNextState Function is where the index configuration system 106 retrieves the node corresponding to the next state s' based on the given state s and action a. If s' does not exist in the search tree, the index configuration system 106 creates a node for s' by calling CreateNode(s', I). As another example, the SelectAction Function is where the index configuration system 106 selects an action a∈A(s) for the given state s based on an action selection policy.

As another example, the Rollout function is where the index configuration system 106 generates an index configuration by randomly inserting indexes. In some implementations, the details of this randomization procedure, called a rollout policy, depend on the action selection policy. Additional details regarding a rollout policy are provided below. As a further example, the ExtractBestConfiguration Function is where the index configuration system 106 extracts the best index configurations from the search tree, which is also described below, As noted above, the index configuration system 106 can utilize one or more action selection policies in connection with MCTS. Indeed, the index configuration system 106 can employ various policies for (1) action selection, (2) rollout, and (3) extraction of the best index configurations. Additional detail is provided below regarding design considerations and implementation details of these MCTS policies.

In various implementations, an action selection policy π(a|s) specifies that, given a state s, which action a the index configuration system 106 should take next. Two action selection policies that the index configuration system 106 adapts for index tuning include UCT and ϵ-greedy. For example, the UCT policy models action selection as a stochastic multi-armed bandit problem and uses the upper confidence bound (UCB) for the tradeoff between exploration and exploitation. Specifically, given state s and a set of actions A(s), then N(s) is the number of visits to the state s, and n(s, a) is the number of visits to an action a∈A(s). In these implementations, $N(s) = \Sigma_{a \in A(s)} n(s, a)$.

Further, assuming that rewards fall in the range of [0, 1], the UCT policy picks the action a∈A(s) that maximizes the UCB score $$\left(\text{i.e., argmax}_a \left[\hat{Q}(s, a) + \lambda \cdot \sqrt{\frac{\ln N(s)}{n(s, a)}}\right]\right).$$

As described above, the index configuration system 106 utilizes rewards in this range when searching for index configurations utilizing the MDP, which is based on percentage improvements as rewards.

In various implementations, the index configuration system 106 utilizes $\hat{Q}(s,a)$ to represent the current estimate of the action value function Q(s,a), which can represent the average return by taking the action a at the state s. The initial value of $\hat{Q}(s,a)$ is zero since no reward has been accumulated. In additional implementations, λ represents a constant that balances exploration and exploitation. In some instances, $\lambda = \sqrt{2}$.

In some instances, the UCT policy is that it makes slow progress when there is a large number of candidate indexes. Based on the UCB criterion in $$\text{argmax}_a \left[\hat{Q}(s, a) + \lambda \cdot \sqrt{\frac{\ln N(s)}{n(s, a)}}\right],$$

once a tree node is expanded, all of its child nodes have to be visited at least once before any of them can be further expanded. This is because child nodes that are not visited, i.e., with n(s, a)=0, would receive infinite UCB scores. As a result, given a relatively small budget B, only the first one or two levels of the search tree would be expanded.

As another example, utilizing the ϵ-greedy policy, the index configuration system 106 picks the best action found so far, (i.e., the index with the largest $\hat{Q}(s,a)$), with probability 1−ϵ, and picks an action uniformly randomly from the rest with probability $$\frac{\varepsilon}{|A(s)| - 1}.$$

One potential drawback of the ϵ-greedy policy is that it does not distinguish among the remaining actions except for the current best one. That is, it is equally likely to select the next-to-best action and the worst action. Accordingly, the index configuration system 106 utilizes a variant that selects an action a with a probability that is proportional to its estimated action value. This can be represented as:

$$Pr(a|s) = \frac{\hat{Q}(s, a)}{\sum_{b \in A(s)} \hat{Q}(s, b)}.$$

In many cases, this variant of the ϵ-greedy policy does not change the convergence of MCTS in the long run. That is, given enough episodes such that all states are visited a sufficient number of times, the estimated action value function $\hat{Q}(s,a)$ can eventually converge to the actual action value function Q(s, a). In fact, in many implementations, choosing a uniformly random action can guarantee the convergence of MCTS. Additionally, when the index configuration system 106 runs the MCTS under limited a budget constraint, the different action selection policies can make a difference due to their different convergence rates.

One new challenge raised by the ϵ-greedy variant under a limited budget is that the estimates $\hat{Q}(s,a)$ can be very sparse. Accordingly, in some implementations, the index configuration system 106 make $\hat{Q}(s,a)$ a reasonable estimate by taking the action a at least once. Further, to address the challenge of visiting every action in large action spaces, in one or more implementations, the index configuration system 106 we assign some "prior reward" to each action a that has not been taken yet. Specifically, the index configuration system 106 defines the prior reward as the percentage improvement of a singleton configuration corresponding to the action a (i.e., η(W, {a})). The index configuration system 106 then initializes $\hat{Q}(s,a)$ with η(W, {a}) independent of the states.

Algorithm 3, shown below, outlines one approach of the index configuration system 106. For example, in a budget-constrained setting the index configuration system 106 selectively picks singletons to evaluate. Specifically, for each budget unit, the index configuration system 106 first selects a query q (e.g., via the QuerySelection Function) and then selects one of its candidate index I that has not yet been evaluated (e.g., via the IndexSelection Function) based on certain query selection and index selection policies, as discussed below.

---

Algorithm 3: Compute percentage improvements for singleton configurations under a limited budget

---

Input: W, the workload; I, the candidate indexes; B', the budget on the number of what-if calls.
Output: η(W, {I}) for all I ∈ I
1.     foreach I ∈ I do
2.         cost (W, {I}) ← c(W, ∅);
3.     for 1 ≤ b ≤ B' do
4.         q ← QuerySelection(W);
5.         I ← QuerySelection(q, I)
6.         cost (W, {I}) ← cost(W,{I}) − c(q, ∅) + c(q, I);
7.     foreach I ∈ I do 8. $$\eta(W, \{I\}) \leftarrow \left(1 - \frac{cost(W, \{I\})}{cost(W, \{\emptyset\})}\right) \times 100\%;$$

---

Regarding the question of how much budget B' on the number of what-if calls the index configuration system 106 should give to Algorithm 3, in one or more implementations, the index configuration system 106 sets B'=min(B/2, P), where B is the total budget for index tuning and P is the total number of query-index pairs.

In some implementations, the index configuration system 106 utilizes the same strategies for query selection as the EvalateCostWithBudget Function, provided above. In alternative implementations, the index configuration system 106 aims to find impactful indexes (i.e., singleton configurations) at the workload level, which implies encouraging more exploring of new queries to find new indexes rather than exploiting queries that have been selected before (e.g., the goal of query selection is different than the EvalateCostWithBudget Function as used above).

Accordingly, in some implementations, the index configuration system 106 utilizes a round-robin strategy, which yields robust results. In additional implementations, to address the scalability issue, the index configuration system 106 further combines the round-robin approach with other heuristics. For example, the index configuration system 106 selects a subset (e.g., a random sample) of the queries and applies round-robin only within this subset.

In some implementations, the index configuration system 106 favors candidate indexes over large tables. Intuitively, for a given query, indexes over large tables are more useful. That is, in various implementations, the index configuration system 106 first selects indexes on the largest table accessed by the query, then selects indexes on the second-largest table, and so on. This strategy is particularly beneficial when utilizing an index tuning constraint.

As mentioned above, the index configuration system 106 can implement one or more rollout policies in connection with the Monte Carlo tree search model 600. In various implementations, the rollout policy specifies how to generate a configuration by randomly inserting indexes. Specifically, in one or more implementations, the index configuration system 106 generates a "look-ahead step size" (i.e., $l \in \{0, 1, \ldots K-d\}$ in a uniformly random manner, where d is the depth of the current state s in the search tree.

In certain implementations, the index configuration system 106 inserts l indexes, randomly chosen from A(s) depending on the action selection policy. For example, for the UCT policy, the index configuration system 106 chooses the l indexes uniformly. As another example, for the $\epsilon$-greedy policy, the index configuration system 106 chooses the l indexes from A(s) with respect to the priors of actions, (i.e., the probability of sampling $a \in A(s)$ is given by the Pr(a|s) equation, where we use the prior reward of the action a for $\hat{Q}(s,a)$).

The index configuration system 106 can utilize other possible rollout policies. For instance, in one or more implementations, rather than using a randomly generated look-ahead step size, the index configuration system 106 utilizes a fixed look-ahead step size, such as 0 or 1, which allows for more exploration in the neighborhood of the current state compared to remote regions in the entire search space.

FIGS. 7A-7B illustrate an example of generating index configuration subsets shown as budget allocation matrices in accordance with one or more implementations. As shown, FIG. 7A shows index configuration subsets (layouts) 700 that include various example budget allocation matrices including a first budget allocation matrix 702a, a second budget allocation matrix 702b, and a third budget allocation matrix 702c (collectively "budget allocation matrices 702"). As shown, each of the budget allocation matrices 702 include rows 706 of queries from a workload as well as columns 704 of potential indexes combination (multiple candidate index combinations). Each of the budget allocation matrices 702 can represent an index configuration subset determined by the index configuration system 106 during the index configuration enumeration process. More specifically, each of the index configuration subsets indicates which queries and subsets of indexes the index configuration system 106 provides to the query optimizer for a cost analysis. In some instances, each index configuration subset is called a layout.

As shown, the budget allocation matrices 702 correspond to a workload $W = \{q_1, q_2, q_3\}$ and candidate indexes $I_1, I_2, I_3$. Additionally, the cells with an "X" represent query/index(es) what-if calls to the query optimizer, as determined during the index configuration enumeration process, described above. In some implementations, as noted below, the index configuration system 106 replaces the Xs with the value of 1. Also, as shown in FIG. 7A, the budget allocation matrices 702 includes the cardinality constraint (e.g., budget constraint) of 7.

Each specific way of filling in the cell values of a budget allocation matrix is called a layout. In various implementations, a layout of a budget allocation matrix (i.e., B) is an ordered mapping $\phi: [B] \rightarrow \{B_{ij}\}$, where $[B]=\{1, 2, \ldots, B\}$, $1 \leq i \leq N$, and $1 \leq j \leq M$, such that $v(\phi)(b))=1$ for $b \in [B]$. Intuitively, the layout of a budget allocation matrix captures the trace of the what-if calls issued during configuration enumeration.

As mentioned above, in one or more implementations, the budget allocation matrix (i.e., B) is an N×M matrix, where $N=2^{|I|}-1$ and $M=|W|$. In these implementations, each row of the budget allocation matrix can represent a configuration from indexes in I and each column of B represents a query from W. A cell $B_{ij}$ receives the value of 1 if the what-if cost $c(q_i, C_j)$ is known (i.e., a what-if call has been made) for the corresponding query $q_i \in W$ and index configuration $C_j \in 2^I$ (where $1 \leq i \leq N$ and $1 \leq j \leq M$). Otherwise, cell $B_{ij}$ receives the value of 0. In these implementations, the index configuration system 106 sums the cell values to verify the budget constraint (e.g., the cardinality constraint). Indeed, the total value of the cells with the value of 1 should equal the budget B on the number of what-if calls allowed.

As described above, the index configuration system 106 relies on cost approximation in various implementations of budget-aware index tuning. Accordingly, in various implementations, the index configuration system 106 determines for which index configurations and queries to use what-if calls costs and to use cost approximation for the remainder. In this manner, the index configuration system 106 can address the budget allocation problem of, given a budget on the number of what-if calls, how to distribute it to the queries and configurations to achieve the best workload cost improvement.

In various implementations, in solving this problem, the index configuration system 106 utilizes a budget allocation matrix. To illustrate, FIG. 7B, shows the first budget allocation matrix 702a. For each cell represented by an X in FIG. 7A, the first budget allocation matrix 702a includes known cost cells 710 having the what-if call cost (i.e., c(q, C)). For the other cells (e.g., derived cost cells 712), the index configuration system 106 includes the derived cost (i.e., d(q, C)). In some implementations, the index configuration system 106 derives the cost of a cell based on the what-if call cost in the same column (e.g., for the same query). Upon determining the costs, the index configuration system 106 can combine (e.g., sum) the total cost of a layout to determine which layout has the lowest cost.

In some implementations, a column of a budget allocation matrix does not have any what-if costs for a query. For example, the third budget allocation matrix 702c shows no what-if calls for the third query. In this case, the index configuration system 106 may be unable to accurately determine derived costs for other cells in the column. However, in these instances, the index configuration system 106 can dismiss the empty query/column as trivial. Indeed, when a query/column lacks what-if call costs, the index configuration system 106 can determine that the query/column is unnecessary and/or not needed to effectively process the requested workload. Accordingly, the index configuration system 106 can populate these cells with the value of zero, null, or default values.

Upon identifying an optimal index configuration, the index configuration system 106 can extract the corresponding subset of indexes. In various implementations, the index configuration system 106 utilizes various strategies to extract the best (e.g., optimal) index configuration from the search tree. To illustrate, the index configuration system 106 can utilize a best configuration explored (BCE) extraction strategy. Here, the index configuration system 106 returns the best configuration found during the MCTS method, among the index configurations explored. The explored index configurations can include all configurations corresponding to states in the final expanded search tree, as well as configurations sampled by rollouts.

In some implementations, the index configuration system 106 utilizes a best greedy (BG), extraction strategy. Here, the index configuration system 106 uses a greedy strategy to traverse the search tree. Additionally, the index configuration system 106 can employ various variants based on what metric to be optimized. For example, in some instances, the BG extraction strategy works similarly to the Greedy algorithm provided above in Algorithm 1 (although it is not tied to minimizing the workload cost). For instance, the index configuration system 106 picks the action that maximizes the estimated average return (i.e., $\hat{Q}(s,a)$), in each greedy step. In alternative implementations, when implementing the UCT policy, the index configuration system 106 maximizes the UCB score or even the most frequent action.

In a number of implementations, the index configuration system 106 utilizes the BG extraction strategy by reusing Algorithm 1. For instance, this approach does not rely on the action selection policy used. Additionally, it simplifies implementation due to code reusability and makes the integration with existing index tuning systems easier. Further, it can significantly outperform the BCE strategy, as discovered in evaluation results. Moreover, it yields additional benefits and desired properties when combined with cost derivation and budget allocation strategies.

Researchers performed several evaluations comparing the index configuration system 106 to baselines and state-of-the-art systems (e.g., existing RL approaches such as DBA bandits). Compared with baselines, they found that the MCTS model approach of the index configuration system 106 outperforms the baselines consistently and often significantly, especially with small tuning budgets. Compared with existing RL approaches, the researchers also found that the index configuration system 106 significantly outperforms DBA bandits as well as other baselines in various tests.

Overall, the researchers found that the index configuration system 106 (e.g., the MCTS-based solution) can often significantly outperform the budget-aware greedy algorithms as well as variants of existing RL-based approaches to index tuning, across a variety of industrial benchmarks and real workloads. Indeed, the researchers found that the index configuration system 106 produces increased accuracy with lower computational requirements than existing approaches.

Figure 8:
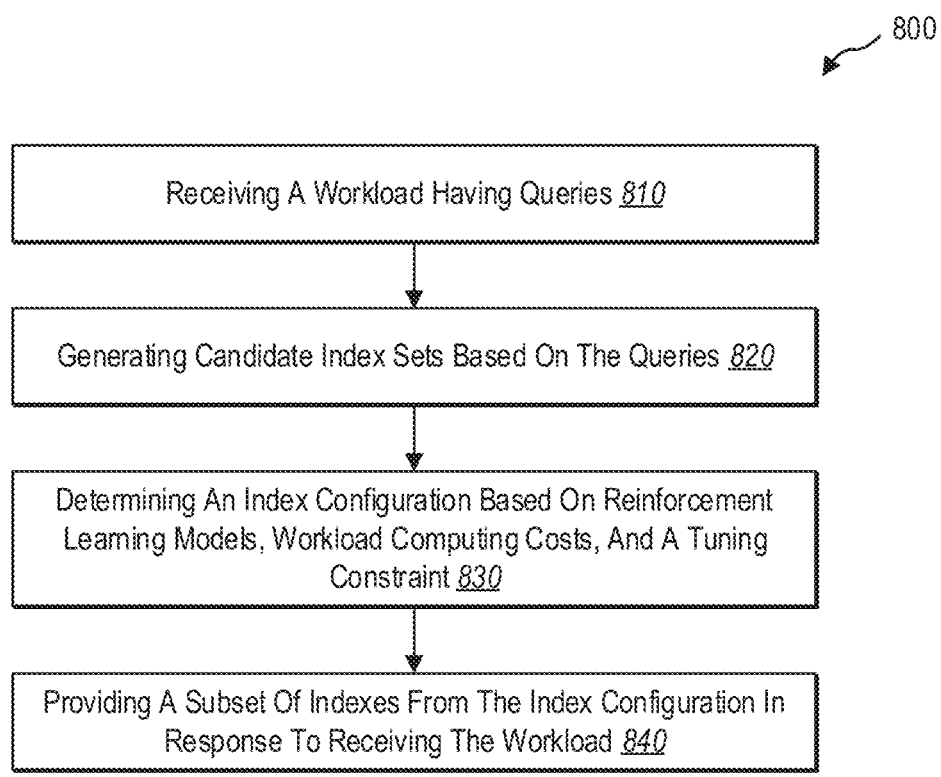
FIG. 8 illustrates an example series of acts for generating and providing a subset of indexes for and index configuration in accordance with one or more implementations.

Turning now to FIG. 8, this figure illustrates an example flowchart including a series of acts for generating and providing a subset of indexes for an index configuration in accordance with one or more implementations described herein. While FIG. 8 illustrates acts according to one or more implementations, alternative implementations may omit, add to, reorder, and/or modify any of the acts shown in FIG. 8. The acts of FIG. 8 can be performed as part of a method. Alternatively, a non-transitory computer-readable medium can include instructions that, when executed by one or more processors, cause a computing device to perform the acts of FIG. 8. In still further implementations, a system can perform the acts of FIG. 8.

For example, FIG. 8 illustrates a series of acts 800 for generating and providing a subset of indexes for an index configuration. The series of acts 800 includes an act 810 of receiving a workload having queries. For instance, the act 810 may involve receiving, at an index tuner, a workload including a set of queries corresponding to one or more databases.

As further shown, the series of acts 800 includes an act 820 of generating candidate index sets based on the queries. For example, the act 820 may involve generating, by the index tuner, a set of candidate indexes based on the set of queries, where the set of candidate indexes includes candidate index combinations.

As further shown, the series of acts 800 includes an act 830 of determining an index configuration based on reinforcement learning models, workload computing costs, and a tuning constraint. For example, the act 830 may include determining, by the index tuner, an index configuration from the set of candidate indexes by identifying a plurality of index configurations from the set of candidate indexes utilizing one or more reinforcement learning models, determining workload computing costs for a subset of the plurality of index configurations based on a query optimizer and an index tuning constraint (e.g., a tuning constraint such as a number of what-if calls), and selecting the index configuration from the plurality of index configurations based on the workload computing costs, where the index configuration includes a subset of candidate indexes.

As further shown, the series of acts 800 includes an act 840 of providing a subset of indexes from the index configuration in response to receiving the workload. For example, the act 840 may involve providing the subset of candidate indexes in response to receiving the workload.

In one or more implementations, the series of acts 800 includes additional acts. For example, in some implementations, the one or more reinforcement learning models include a Markov decision process having state transitions, actions, and rewards. In various implementations, the one or more reinforcement learning models further include a Monte Carlo tree search model that follows the state transitions of the Markov decision process to identify the plurality of index configurations from the set of candidate indexes.

In one or more implementations, the one or more reinforcement learning models utilize one or more selection policies to identify the index configuration from the plurality of index configurations. In some implementations, the one or more selection policies include upper confidence bounds for search trees policy (UCT) or an estimated action value proportional-based policy (ϵ-Greedy).

In various implementations, determining the workload computing costs for the subset of the plurality of index configurations includes providing the subset of the plurality of index configurations to the query optimizer for what-if cost estimation calls, and where the what-if cost estimation calls are based on one or more queries in the set of queries and index configurations from the subset of the plurality of index configurations.

In example implementations, the tuning constraint includes a predetermined number of what-if calls to the query optimizer. In additional implementations, the subset of the plurality of index configurations corresponds to the tuning constraint, and/or a first number of the plurality of index configurations is greater than the predetermined number of what-if calls of the tuning constraint.

In certain implementations, determining the workload computing costs for the subset of the plurality of index configurations includes generating a computing costs allocation matrix including values corresponding to the plurality of index configurations. In some implementations, the computing costs allocation matrix includes rows based on the set of candidate indexes and columns based on the set of queries. In various implementations, generating the computing costs allocation matrix further includes determining additional workload computing costs values in the computing costs allocation matrix for additional index configurations in the plurality of index configurations, the additional index configurations are not included in the subset of the plurality of index configurations, and the additional index configurations are determined from the values corresponding to the subset of the plurality of index configurations.

In some implementations, generating the computing costs allocation matrix further includes detecting a query in the computing costs allocation matrix having no values corresponding to the subset of the plurality of index configurations and populating intersecting entries in the computing costs allocation matrix between the query and the plurality of index configurations with null or default values. In one or more implementations, the series of acts includes populating cells of the computing costs allocation matrix corresponding to the subset of the plurality of index configurations with a value of one (i.e., 1). In additional implementations, the sum of the cells in the computing costs allocation matrix equals the tuning constraint on the number of what-if calls.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the index configuration system 106. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special purpose computer, or special purpose processing device to perform a certain function or group of functions. In some embodiments, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 9:
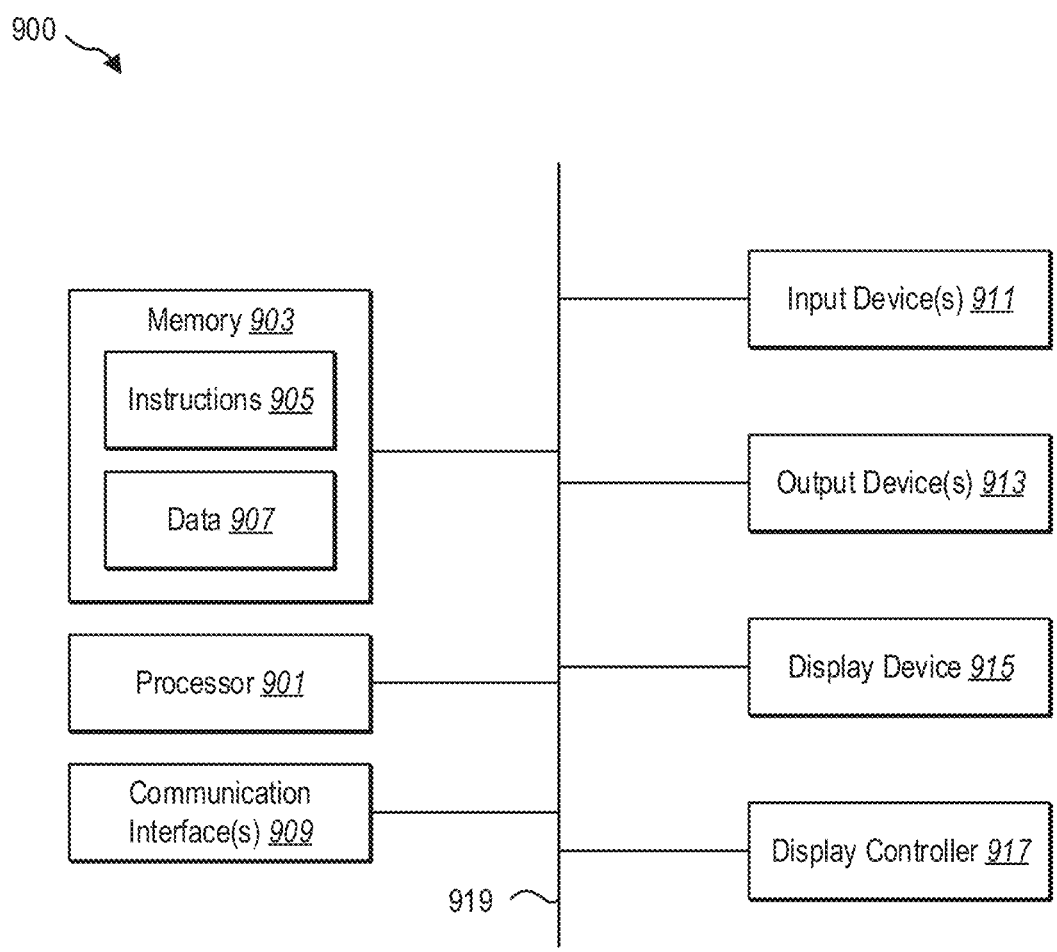
FIG. 9 illustrates certain components that may be included within a computer system.

FIG. 9 illustrates certain components that may be included within a computer system 900. The computer system 900 may be used to implement the various devices, components, and systems described herein.

In various implementations, the computer system 900 may represent one or more of the client devices, server devices, or other computing devices described above. For example, the computer system 900 may refer to various types of client devices capable of accessing data on a cloud computing system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processor 901. The processor 901 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface(s) 909 include a Universal Serial Bus (USB), an Ethernet adapter, a wireless adapter that operates in accordance with an Institute of Electrical and Electronics Engineers (IEEE) 902.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. a specific type of output device that is typically included in a computer system 900 is a display device 915. The display device 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described concerning an embodiment herein may be combinable with any element or feature of any other embodiment described herein, where compatible.

The present disclosure may be embodied in other specific forms without departing from its spirit or characteristics. The described embodiments are to be considered illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method for performing index tuning within a relational database system, comprising:
   receiving, at an index tuner, a workload comprising a set of queries corresponding to one or more databases;
   generating, by the index tuner, a set of candidate indexes based on the set of queries, wherein the set of candidate indexes comprises multiple candidate index combinations;
   determining, by the index tuner, an index configuration from the set of candidate indexes by:
      identifying a plurality of index configurations from the set of candidate indexes utilizing one or more reinforcement learning models;
      determining workload computing costs for a subset of the plurality of index configurations based on a query optimizer and a predetermined threshold tuning constraint; and
      selecting the index configuration from the plurality of index configurations based on the workload computing costs, wherein the index configuration comprises a subset of candidate indexes from the set of candidate indexes; and
   providing the subset of candidate indexes in response to receiving the workload.

2. The computer-implemented method of claim 1, wherein the one or more reinforcement learning models comprise a Markov decision process having state transitions, actions, and rewards.

3. The computer-implemented method of claim 2, wherein the one or more reinforcement learning models further comprise a Monte Carlo tree search model that follows the state transitions of the Markov decision process to identify the plurality of index configurations from the set of candidate indexes.

4. The computer-implemented method of claim 1, wherein the one or more reinforcement learning models utilize one or more selection policies to identify the index configuration from the plurality of index configurations.

5. The computer-implemented method of claim 4, wherein the one or more selection policies comprise upper confidence bounds for search trees policy or an estimated action value proportional-based policy.

6. The computer-implemented method of claim 1, wherein determining the workload computing costs for the subset of the plurality of index configurations comprises providing the subset of the plurality of index configurations to the query optimizer for what-if cost estimation calls, and wherein the what-if cost estimation calls are based on one or more queries in the set of queries and index configurations from the subset of the plurality of index configurations.

7. The computer-implemented method of claim 1, wherein the predetermined threshold tuning constraint comprises a predetermined number of what-if calls to the query optimizer.

8. The computer-implemented method of claim 1, wherein:
   a first number of the plurality of index configurations is greater than the predetermined number of what-if calls of the predetermined threshold tuning constraint.

9. The computer-implemented method of claim 1, wherein determining the workload computing costs for the subset of the plurality of index configurations comprises generating a computing costs allocation matrix comprising values corresponding to the plurality of index configurations.

10. The computer-implemented method of claim 9, wherein the computing costs allocation matrix comprises rows based on the set of candidate indexes and columns based on the set of queries.

11. The computer-implemented method of claim 9, wherein:
   generating the computing costs allocation matrix further comprises determining additional workload computing costs values in the computing costs allocation matrix for additional index configurations in the plurality of index configurations;
   the additional index configurations are not included in the subset of the plurality of index configurations; and
   the additional index configurations are determined from the values corresponding to the subset of the plurality of index configurations.

12. The computer-implemented method of claim 10, wherein generating the computing costs allocation matrix further comprises:
   detecting a query in the computing costs allocation matrix having no values corresponding to the subset of the plurality of index configurations; and
   populating intersecting entries in the computing costs allocation matrix between the query and the plurality of index configurations with null or default values.

13. The computer-implemented method of claim 9, further comprising:
   populating cells of the computing costs allocation matrix corresponding to the subset of the plurality of index configurations with a value of 1; and
   wherein a sum of the cells in the computing costs allocation matrix equals the predetermined threshold tuning constraint on the number of "what if" calls.

14. A system for performing index tuning within one or more relational databases, the system comprising:
   one or more databases;
   an index tuner having candidate indexes and an index predetermined threshold tuning constraint, wherein the predetermined threshold tuning constraint comprises a predetermined number of what-if calls to the query optimizer;
   a query optimizer that determines workload cost estimates based on queries and index configurations; and
   a non-transitory computer memory comprising instructions that, when executed by at least one processor, cause the system to:
      receive, at the index tuner, a workload comprising a set of queries corresponding to the one or more databases;
      generate, by the index tuner, a set of candidate indexes from the candidate indexes based on the set of queries, wherein the set of candidate indexes comprises candidate index combinations;
      determine, by the index tuner, an index configuration from the set of candidate indexes by:
         identifying a plurality of index configurations from the set of candidate indexes utilizing one or more reinforcement learning models;

determining workload computing costs for a subset of the plurality of index configurations based on the query optimizer and the index predetermined threshold tuning constraint; and selecting the index configuration from the plurality of index configurations based on the workload computing costs, wherein the index configuration comprises a subset of candidate indexes from the set of candidate indexes; and provide the subset of candidate indexes in response to receiving the workload.

15. The system of claim 14, wherein:

the one or more reinforcement learning models comprise a Markov decision process having state transitions, actions, and rewards; and the one or more reinforcement learning models further comprise a Monte Carlo tree search model that follows the state transitions of the Markov decision process to identify the plurality of index configurations from the set of candidate indexes.

16. The system of claim 14, wherein:

the one or more reinforcement learning models utilize one or more selection policies to identify the index configuration from the plurality of index configurations; and the one or more selection policies comprise upper confidence bounds for search trees policy or an estimated action value proportional-based policy.

17. The system of claim 14, wherein determining the workload computing costs for the subset of the plurality of index configurations comprises providing the subset of the plurality of index configurations to the query optimizer for what-if cost estimation calls, and wherein the what-if cost estimation calls are based on one or more queries in the set of queries and index configurations from the subset of the plurality of index configurations.

18. The system of claim 14, wherein:

the index predetermined threshold tuning constraint comprises a predetermined number of what-if calls to the query optimizer;

a first number of the plurality of index configurations is greater than the predetermined number of what-if calls of the index predetermined threshold tuning constraint.

19. The system of claim 14, wherein determining the workload computing costs for the subset of the plurality of index configurations comprises generating a computing costs allocation matrix comprising values corresponding to the plurality of index configurations.

20. The system of claim 19, further comprising additional instructions that, when executed by the at least one processor, cause the system to populate cells of the computing costs allocation matrix corresponding to the subset of the plurality of index configurations with a value of one, wherein a sum of the cells in the computing costs allocation matrix equals the predetermined number of what-if calls of the index predetermined threshold tuning constraint.

* * * * *